US012653286B2

(12) United States Patent
Lee et al.

(10) Patent No.: US 12,653,286 B2
(45) Date of Patent: Jun. 16, 2026

(54) CASE FOR A PERSONAL ELECTRONIC DEVICE

(71) Applicant: Apple Inc., Cupertino, CA (US)

(72) Inventors: Jae Hwang Lee, Los Gatos, CA (US); J. Gerson Goldberg, Menlo Park, CA (US); Mitchell Suckle, Long Beach, CA (US); Vijendra Nalwad, Newbury Park, CA (US); John Wadsworth, Burbank, CA (US); Roger Fan, Dongguan City (CN); Yan Zhuang, Shenzhen (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/418,044

(22) Filed: Jan. 19, 2024

(65) Prior Publication Data

US 2025/0234971 A1 Jul. 24, 2025

(51) Int. Cl.
*A45C 13/02* (2006.01)
*A45C 11/00* (2006.01)
(Continued)

(52) U.S. Cl.
CPC .............. *A45C 11/00* (2013.01); *A45C 13/02* (2013.01); *A45C 13/103* (2013.01); *B32B 5/02* (2013.01);
(Continued)

(58) Field of Classification Search
CPC ....... A45C 11/00; A45C 13/02; A45C 13/103; A45C 2013/025; A45C 2013/1015;
(Continued)

(56) References Cited

U.S. PATENT DOCUMENTS

| | | | |
|---|---|---|---|
| 2,415,054 A | 1/1947 | Marcel | |
| 3,313,382 A | 4/1967 | Rosing et al. | |
| | (Continued) | | |

FOREIGN PATENT DOCUMENTS

| | | |
|---|---|---|
| CN | 104323554 B | 5/2016 |
| CN | 209788791 U | 12/2019 |
| | (Continued) | |

OTHER PUBLICATIONS

Sonicgrace, Inc, Carrying Case Compatible with Quest 2, Sonicgrace for Oculus Quest 2 Carry Case, https://www.amazon.com/Sonicgrace-Quest-Elite-Strap-Controllers-Accessories-2/dp/B0BK2CZRSM?th=1. Reflects a "Date First Available" of Oct. 21, 2022.
(Continued)

*Primary Examiner* — Jacob K Ackun
(74) *Attorney, Agent, or Firm* — Sterne, Kessler, Goldstein & Fox P.L.L.C.

(57) ABSTRACT

A case for storing and carrying a personal electronic device may include a first shell and a second shell each including a rigid layer, a foam layer, batting, and an outer jacket. The rigid layer may have a concave inner surface and a convex outer surface, the foam layer may cover the outer surface of the rigid layer, the batting may cover the foam layer, and the outer jacket may cover the batting. The first shell and the second shell may be hingedly connected at edges thereof so as to be opened and closed. When closed together, the first shell and the second shell may form an interior cavity of the case.

21 Claims, 24 Drawing Sheets

(51) Int. Cl.

| | | |
|---|---|---|
| *A45C 13/10* | (2006.01) | |
| *B32B 5/02* | (2006.01) | |
| *B32B 5/18* | (2006.01) | |
| *B32B 5/24* | (2006.01) | |
| *B32B 5/26* | (2006.01) | |

(52) U.S. Cl.
CPC ................ *B32B 5/18* (2013.01); *B32B 5/245* (2013.01); *B32B 5/26* (2013.01); *A45C 2013/025* (2013.01); *A45C 2013/1015* (2013.01); *B32B 2250/05* (2013.01); *B32B 2307/558* (2013.01); *B32B 2439/40* (2013.01)

(58) Field of Classification Search
CPC .. B32B 5/02; B32B 5/18; B32B 5/245; B32B 5/26; B32B 2250/05; B32B 2307/558; B32B 2439/40
USPC .......................................... 206/320, 576, 701
See application file for complete search history.

(56) References Cited

U.S. PATENT DOCUMENTS

| | | | |
|---|---|---|---|
| 5,810,171 A | 9/1998 | Lee | |
| 8,353,400 B2 | 1/2013 | Santy et al. | |
| 2004/0071371 A1 | 4/2004 | Maher et al. | |
| 2013/0220859 A1* | 8/2013 | Roach | .................... B65D 85/00 |
| | | | 206/438 |

| | | | |
|---|---|---|---|
| 2013/0228485 A1* | 9/2013 | Roach | ................ A45C 13/1084 |
| | | | 206/370 |
| 2020/0037719 A1 | 2/2020 | Jaworski et al. | |
| 2021/0068519 A1 | 3/2021 | Rogers | |
| 2023/0146462 A1* | 5/2023 | Gu | ........................ H02J 7/0047 |
| | | | 206/251 |

FOREIGN PATENT DOCUMENTS

| | | |
|---|---|---|
| CN | 211167939 U | 8/2020 |
| CN | 212088503 U | 12/2020 |
| CN | 220109295 U | 12/2023 |

OTHER PUBLICATIONS

Solo, Paramount Retractable Strap Briefcase—SGB300, Dated Mar. 20, 2017, https://www.youtube.com/watch?v=iUI2F7rlW9w&t=30s. Mar. 20, 2017.

Geekria, Geekria Shield Headphones Case, MG20 Wireless Case, Replacement Hard Shell Travel Carrying Bag with Cable Storage, https://www.amazon.com/UltraShell-Headphone-Protective-Carrying-Accessories/dp/B07WCXBSZK. Reflects a "Date First Available" of Aug. 10, 2019.

Hermitshell, Hermitshell Hard EVA Travel Case, https://www.amazon.com/Hermitshell-RAVPower-26800mAh-External-Battery/dp/B01M9AYN19?th=1. Reflects a "Date First Available" of Oct. 14, 2016.

Partial International Search Report for Application No. PCT/US2024/61525, mailed on Mar. 11, 2025, 12 pages.

* cited by examiner

CASE FOR A PERSONAL ELECTRONIC DEVICE

FIELD

The described embodiments relate generally to a case for carrying a personal electronic device. More specifically, the present embodiments relate to an electronic device travel case having features for protecting and adjustably storing and carrying a personal electronic device such as a head-mounted display and accessories.

BACKGROUND

Many portable electronic products may be conducive to storing and transporting in a travel case. The travel case allows carrying and protection of a portable electronic product. Current travel cases for electronic products may be made of rigid materials, such as polymers, which can be set in their final form by a molding process. Such rigid cases tend be hard and unyielding, which can be unpleasant to hold. Further, such cases tend not to be readily adjustable to conform to and hold different sizes of a device—such as differently-sized head-mounted-display devices—in a secure position, thus lacking versatility.

Accordingly, there exists a need for a new and improved travel case material and/or structure that can protect electronic devices and provide cushioning characteristics during travel, while lasting longer and being able to readily accommodate and securely hold different sizes of electronic devices.

SUMMARY

Some embodiments are directed to a case for storing and carrying a personal electronic device, such as a head-mounted display. The case may include a first shell and a second shell hingedly connected at edges thereof. The first shell and the second shell, when closed, together may form an interior cavity. Each of the first and second shells may include a rigid layer having a concave inner surface and a convex outer surface, a foam layer disposed on and covering the outer surface of the rigid layer, batting disposed on and covering the foam layer, and an outer jacket disposed on and covering the batting. The outer jacket may form an outermost surface of its respective shell. The case may be configured to be opened and closed by rotating the first shell and the second shell relative to each other about their hinged connection.

In some embodiments, the rigid layer may be thermoformed polycarbonate, and the foam layer may be polyethylene foam.

In some embodiments, each shell may further include a nonwoven fabric layer between the batting and the foam layer. The outer jacket may be a polyester fabric.

In some embodiments, the batting may be compressible and the outer jacket may be flexible, such that the outermost surface of each shell may not maintain a fixed shape during handling by a user.

In some embodiments, the rigid layer may maintain a fixed shape during handling by a user.

In some embodiments, a distance between the outer jacket and the foam layer changes in areas where forces may be applied by the user, during handling by a user.

In some embodiments, the batting may be formed in a plurality of layers, and a nominal thickness of the batting may increase toward a midpoint of the outer surface of its respective shell.

In some embodiments, the batting may space the outer jacket away from the foam layer by at least ¼ inch at its maximum.

In some embodiments, the case may further include a zipper, cooperating portions of the zipper disposed along edges of each of the first shell and the second shell.

In some embodiments, each of the first and second shells may further include a molded foam disposed on and covering the inner surface of the rigid layer.

In some embodiments, the molded foam may be covered by an internal fabric.

In some embodiments, an interior surface of the molded foam has a shape that may not follow the shape of the inner surface of the rigid layer. The shape may include a pair of recesses disposed at a front end of at least one of the first shell and the second shell.

In some embodiments, the outer jacket may form a first pocket underneath the hinged connection between the first shell and the second shell and a second pocket on an opposite side of the first pocket. In some embodiments, the case further may include a strap extending between the first pocket and the second pocket.

In some embodiments, the strap may have a nominal position and an extended position in which there is a greater space between the strap and the rest of the case than in the nominal position. In some embodiments, portions of the strap may be extendable out from the first pocket and the second pocket to move the strap to the extended position, and the portions of the strap may be retractable into the first pocket and the second pocket to move the strap to the nominal position.

In some embodiments, the strap may be biased toward the nominal position such that the portions of the strap will automatically retract into the first pocket and the second pocket in the absence of an applied force.

Some embodiments may be directed to a portable storage case. The portable storage case may include a rigid shell, a flexible jacket surrounding an exterior of the rigid shell, and batting disposed between the rigid shell and the flexible jacket. The batting may space the flexible jacket away from the rigid shell such that the batting compresses against the rigid shell when the case is gripped by a user.

In some embodiments, thickness of the jacket may increase over the exterior of the shell in a direction away from edges of the rigid shell.

In some embodiments, the rigid shell may be formed by a first shell and a second shell that are hingedly connected to each other, which are opened and closed by a locking mechanism.

In some embodiments, portable storage case may further include a nonwoven fabric layer between the batting and the foam layer. The jacket may be a polyester fabric some embodiments.

In some embodiments, the jacket may be formed of multiple panels of the nonwoven material connected at seams.

Some embodiments are directed to a case for storing and carrying a personal electronic device, such as a head-mounted display. The case may include a first shell and a second shell forming an interior cavity, and a slider mechanism coupled to the first shell. In some embodiments, the slider mechanism may include a slide base fixed to a rigid layer of the first shell, a shield movably connected to the slide base, and a slider handle that can be manipulated by a user to be secured or unsecured relative to the slide base. The shield may extend within the first shell away from the slide base and may be configured to linearly translate relative to the slide base. The shield may adjustably define a product-receiving space between the shield and a front portion of the first shell. The shield may be held in position relative to the slide base when the slider handle is secured. The slider handle may be manipulated by a user to slide the shield relative to the slide base when the slider handle is unsecured.

In some embodiments, the slider handle may be secured at any of multiple positions relative to the slide base, such that the shield can similarly be held in position at any of multiple positions relative to the slide base.

In some embodiments, each of the multiple positions at which the shield can be held may define a different distance between the shield and the front portion of the first shell, thereby defining a different size for the product-receiving space.

In some embodiments, the shield may be connected to the slide base at a central position of the shield, and side wings of the shield may extend laterally over and beyond the slide base.

In some embodiments, the shield may be spaced away from side walls of the first shell.

In some embodiments, the slider mechanism may further include a slider movably coupled to the slide base and configured to linearly translate along a sliding track of the slide base. In some embodiments, the shield may be fixed to the slider and movably connected to the slide base by its fixed connection to the slider.

In some embodiments, the slider handle may be fixed to the slider.

In some embodiments, the slider mechanism may further include a first attachment mechanism fixed in position relative to the first shell. In some embodiments, the slider handle may include a second attachment mechanism fixed to the slider handle and being removably coupleable to the first attachment mechanism. The slider handle may be in the secured position when the second attachment mechanism is coupled to the first attachment mechanism. The slider handle may be in the unsecured position when the second attachment mechanism is not coupled to the first attachment mechanism.

In some embodiments, the first and second attachment mechanisms may be hook-and-loop fasteners.

In some embodiments, the slider handle, when secured, can be unsecured by a pulling force pulling the slider handle in a direction away from the slide base and first shell. In addition, the slider handle may be not unsecured by forces applied in the direction of translation of the shield.

In some embodiments, each of the first and second shells may include a rigid layer and a molded foam layer disposed on and covering the inner surface of the rigid layer. The molded foam layer may be covered by an internal fabric.

In some embodiments, the front portion of the first shell internally may be formed of molded foam, such that the product-receiving space may be defined between the shield and molded foam at the front portion of the first shell.

In some embodiments, the molded foam may form a concave boundary for the product-receiving space, and the shield may form a convex boundary for the product-receiving space.

Some embodiments may be directed to a product-retention system for storing a personal electronic device. The product-retention system may include a case forming a cavity with a bottom wall forming a mechanical ground for the product-retention system and side walls, and a shield movably coupled to the mechanical ground and constrained to translate along a straight line. The shield may form an adjustable product-receiving space between a front surface of the shield and a front interior wall of the case, and may extend laterally toward side walls of the case, lateral extents of the shield being spaced away from the side walls. The shield may be temporarily and repeatably fixable at any of multiple positions relative to the mechanical ground. In some embodiments, the shield may not be translated relative to the mechanical ground when fixed relative thereto, and can be translated relative to the mechanical ground when not fixed relative thereto.

In some embodiments, The product-retention system may further include a slide base fixed to the mechanical ground and having tracks along sides of the closed shape, a slider movably coupled to the slide base and constrained to translate along a straight line by a portion thereof sliding within the tracks, a slider handle fixed to the slider and including a releasable first attachment mechanism on a bottom surface thereof, and a second attachment mechanism fixed in place relative to the mechanical ground. The shield may be coupled to the slider and thereby coupled to the mechanical ground, and the constraints on motion of the slider may constrain the motion of the shield. In some embodiments, attaching the first attachment mechanism to the second attachment mechanism may hold the slider—and thereby the shield—in place, preventing it from translating. On the other hand, detaching the first attachment mechanism from the second attachment mechanism may free the slider—and thereby the shield—to be translated and reattached at a different location, thereby changing the size of the product-receiving recess.

In some embodiments, the first attachment mechanism and the second attachment mechanism are hook-and-loop fasteners.

In some embodiments, the slider handle may include a rigid first stop block that moves with the slider handle and prevents buckling of the first attachment mechanism. The slider may include a rigid second stop block that moves with the slider. In some embodiments, when the first attachment mechanism is attached to the second attachment mechanism, the first stop block may be disposed behind and abutting the second stop block.

In some embodiments, when the electronic device is received in the product-receiving space and the first attachment mechanism is attached to the second attachment mechanism, a load applied on the shield from the electronic device may be transferred through the shield, to the second stop block, to the first stop block, and to the mechanical ground.

In some embodiments, the product-retention system may further include a slider constrained to translate along a straight line relative to the mechanical ground by a portion thereof sliding within tracks fixed to the mechanical ground. The shield may be coupled to the slider and thereby coupled to the mechanical ground. The constraints on motion of the slider may constrain the motion of the shield. In some embodiments, the product-retention system may further include a trim ring forming an opening through to the slide base, and providing forward and rearward stops to the translational motion of the slider.

In some embodiments, the product-retention system may further include a slider constrained to translate along a straight line relative to the mechanical ground by a portion thereof sliding within tracks fixed to the mechanical ground. The shield may be coupled to the slider and thereby coupled to the mechanical ground, and the constraints on motion of the slider may constrain the motion of the shield. The slider may include a lower slider portion partially disposed under the slide base and within the tracks, and a shield-holding portion configured to hold the shield in the upright position. The shield-holding portion may extend upward from the mechanical ground into the cavity, and the shield may be fixed to the shield-holding portion at a single connection at a central portion of the shield.

BRIEF DESCRIPTION OF THE DRAWINGS

The disclosure will be readily understood by the following detailed description in conjunction with the accompanying drawings, wherein like reference numerals designate like structural elements, and in which:

FIG. 5A shows an upper section of the first shell and FIG. 5B shows a lower section of the first shell.

FIG. 6A shows an upper section of the second shell and FIG. 6B shows a lower section of the second shell.

FIG. 7A shows the case in a nominal state and FIG. 7B shows the case partially in a compressed state.

FIG. 8A shows and the case in a nominal state and FIG. 8B shows the case in a partially compressed state.

FIG. 16A shows the slider mechanism secured in position in the second position, FIG. 16B shows the slider mechanism unsecured in the second position, FIG. 16C shows the slider mechanism unsecured in the first position, and FIG. 16D shows the slider mechanism secured in the first position.

DETAILED DESCRIPTION

Figure 1:
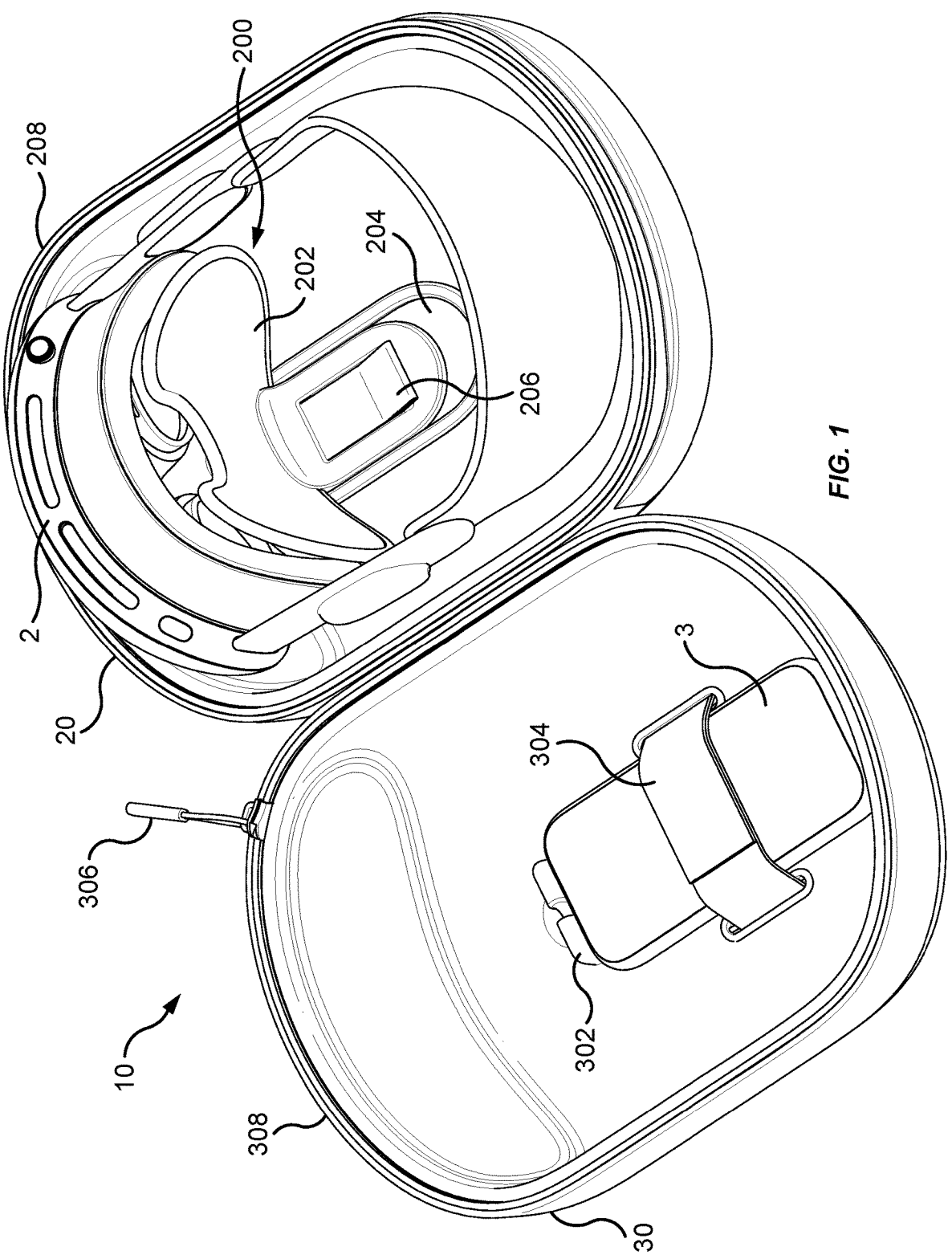
FIG. 1 shows an opened view of a case for electronic device.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to a travel case for electronic devices. A case may come with the electronic device or may be separately available to purchase. For example, consumer electronic devices may come in shipping or retail packaging when delivered to a customer. Such packaging may be temporary and disposable, or may be less suitable for everyday storage and transport by the customer. Once an end user customer removes a purchased item from its packaging, they may have need of a case for everyday storage and transport that can provide portability and easy access to the electronic device and accessories thereof. There are many examples of cases or bags for electronic devices currently available. Some existing examples of cases or bags are made of ethylene vinyl acetate (EVA) to form a hard shell for protection.

Certain types of personal electronic devices may present particular challenges for a case to securely and conveniently store them. For example, a head-mounted display device (e.g., a virtual reality or augmented reality headset) may include sensitive and expensive components, such that a case may be subject to higher safety and security standards than a typical case. Further, a head-mounted display device may be sized to an individual, such that the head-mounted display devices of two different owners may have slight or significant variations in size and shape, leading to different requirements for securing them in the case. A head-mounted display device may also be a combination electronic and textile device, such that its more-sensitive electronic portion may be weightier and more important to securely protect, while its textile portion does not need as much.

Further, a case meant for everyday use, for a personal electronic device, is also an accessory to its user. It can benefit from being fashionable, aesthetically pleasing, and ergonomic, all while still maintaining a high degree of protection and security for the head-mounted display or other device carried therein. In this way, while a sturdy, rigid box may provide a safe and secure environment for the head-mounted display or other device, it may be unsuitable for everyday use because it may be uncomfortable to transport and carry, or it may not appeal to a user for stylistic or other reasons.

Cases described herein provide a packaging/storing solution for a head-mounted display or other personal electronic device that provides improved product protection and portability. In some embodiments, a travel case for an electronic device serves a continuing purpose throughout the life of the device it contains. The disclosed case serves as a case for storing and protecting the device, and/or accessories. The case may include more robust structural features than typical cases, and may include protective interior surfaces specially adapted to protect the stored device throughout repeated usage, while also being easily adaptable to provide the same protection to differently-sized devices. The case may further include cushioning outer structure to dampen an external impact and to improve the tactile feel and overall look of the case. In some embodiments, a retractable handle is provided on the outer shell to allow a user to adjustably carry the case, where the handle automatically retracts when not in use to provide a clean look and inhibit the handle catching or tangling inadvertently.

As will be described in more detail below, the case is formed on the base of a rigid shell for protection and stability, but the exterior of the case is not rigid. To the contrary, it is flexible and soft, and can be compressed by a user when handling the case. This makes the case more readily and easily transportable and approachable to a user. To accomplish this, the case includes a layered outer structure extending over its rigid shell. An outermost layer may be formed of a thin textile, such as a nonwoven material, and in between the rigid shell and outer layer there may be layers of batting or other low-density filling that nominally spaces the outer layer away from the rigid shell, but that is soft and yielding toward the rigid shell when handled by a user, by virtue of compression of the intervening batting.

To this end, in some embodiments, the case may be formed of several layers including a rigid inner layer and soft outer cushioning layer. The rigid layer may not change its shape and protect an electronic device therein while the soft outer layer may change its shape when an external force is applied. The case may be divided into two shells rotatably connected to each other, each shell including the rigid inner layer and the soft outer layer. In addition, the case may have a retractable handle engaged with the soft outer layer and the rigid inner layer. The retractable handle may be configured for a user to manually pull out the handle when needed, and to automatically retract back to the initial position when no external force is applied to the handle.

As will also be described in more detail below, the interior of the case includes features to adjustably and securely hold a head-mounted display or other device in place relative to the interior cavity of the case. In order to be easily accessible to a user it can be desirable that the head-mounted display or other device be there for the taking when the user opens the case. Not buried in some pocket or strapped down under buckles. The case described herein, when opened, includes an open bottom half from which the head-mounted display can be simply lifted out and used. Yet when closed, the head-mounted display is securely maintained in its position within the interior cavity. This is accomplished by a movable shield anchored to the rigid shell of the case. When the head-mounted display is placed into the case, its front portion nests against an interior wall, and the shield is slid forward to effectively "sandwich" the head-mounted display between the shield and the interior wall, holding it in place by constraining its movement (together with the top half of the case when it is closed) without exerting overmuch pressure.

Because the shield slides forward to meet the head-mounted display, this also allows the case to accommodate different sizes of head-mounted display. For example, a head-mounted display may be designed to accommodate differently-sized and -shaped light seals (the portion that goes against a user's head and keeps out external light), based on the size and shape of a user's face/head. In sliding forward to secure the head-mounted display, the shield can be stopped once it securely contacts the light shield, regardless of the size or shape of the light shield, thereby being able to secure a wide variety of sizes, and eliminating the need for a customer to have to select the right size of the case based on their particular head-mounted display or other devices. This adjustability can also provide greater re-usability and thus longer-term use of the case.

As will also be described in more detail below, in some embodiments, an inner material of the case may be a molded foam covered by a fabric. It can be a challenge to hide the transition of the molded foam to the more rigid shell underneath the fabric, due to the difference in materials.

Some embodiments described below achieve this by molding a rigid edge rim with a softer body to cover material joint portions between molded parts by a fabric while creating smooth surfaces throughout the case, particularly, the inner surface of the case. A user can thus can see clean and smooth surfaces of the case. The edge rim can also enhance rigidity where two halves of the case meet.

In some embodiments, the case may further include a feature that allows accommodating accessories such as a charger. Such a feature may be provided on one side of the case while the features for securing the main device (e.g., head-mounted display) may be provided on the other side of the case. The feature for accommodating accessories may have a strap portion and a lock portion to adjustably fix the charger. The accessory may be a battery (e.g., an auxiliary battery for the head-mounted display).

These and other embodiments are discussed below with reference to the accompanying figures. However, those skilled in the art will readily appreciate that the detailed description given herein with respect to these figures is for explanatory purposes only and should not be construed as limiting.

Figure 2:
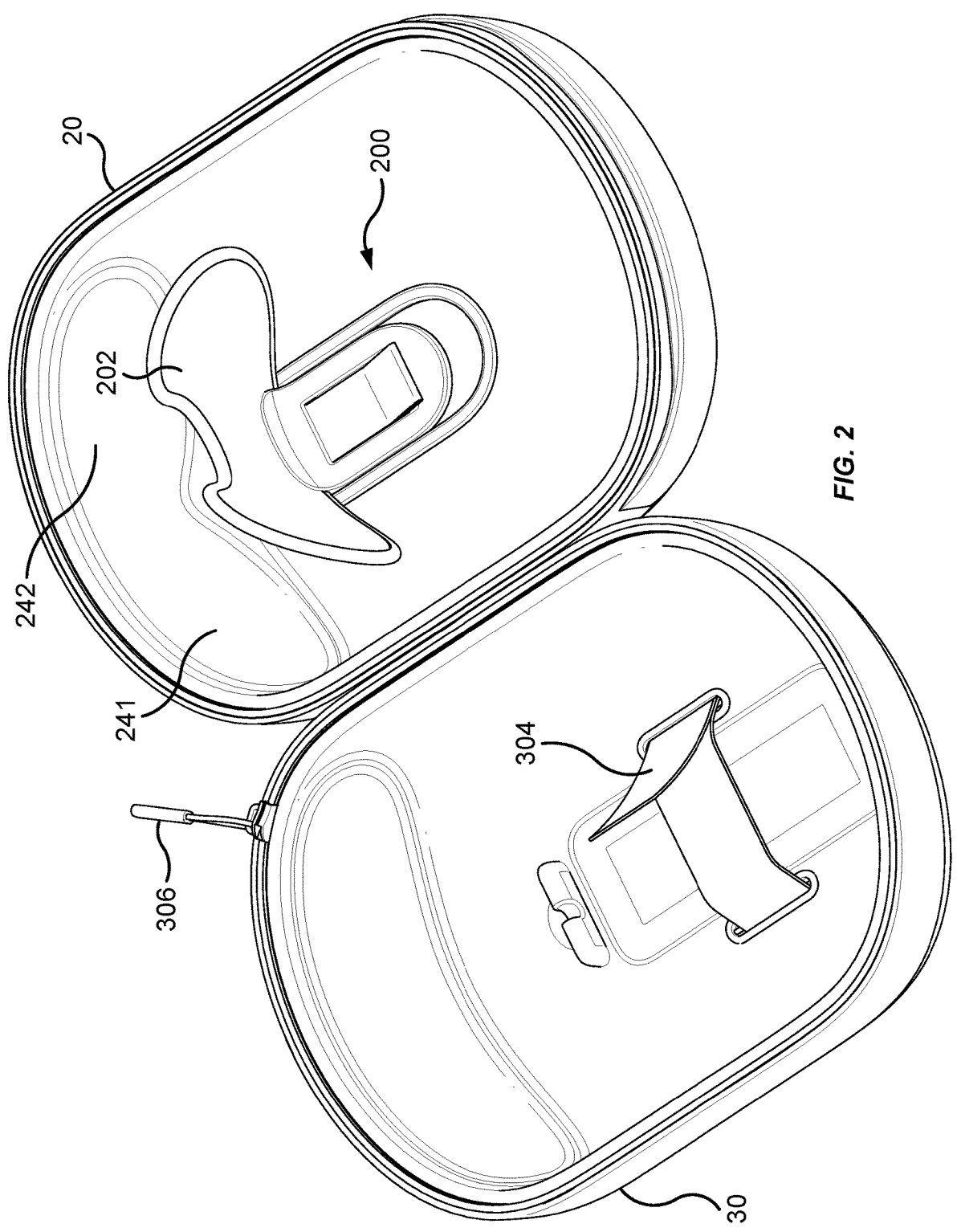
FIG. 2 shows the case of FIG. 1 without products.

FIGS. 1 and 2 illustrate an opened view of a case 10, with and without an electronic device 2 and accessories 3 thereof, respectively. As described herein, the case is shown adapted for storing and securing a head-mounted display, but it should be understood that the concepts and structures discussed are not limited to only head-mounted displays, but could be applied to cases for other articles (e.g., other personal electronic devices).

As shown, case 10 includes a first shell 20 and a second shell 30 that are configured to be open and closed. First and second shells 20, 30 may be hingedly connected at edges thereof, and when closed together, they may together form a closed interior storage cavity with a bottom wall and side walls of case 10. FIGS. 1 and 2 illustrate first shell 20 and a second shell 30 (and thus case 10) in an opened configuration. In this configuration, the interior storage cavity is accessible to a user. Each shell includes a compartment space for receiving and securing an electronic device and its accessories. FIG. 1 shows a head-mounted display 2 fitted in first shell 20 and a battery fitted in second shell 30 as an example.

In some embodiments, first shell 20 includes a slider mechanism 200 including a shield 202, a slider 204, and a slider handle 206. Slider handle 206 can be secured or unsecured such that when unsecured shield 202 may be configured to slide along slider 204 by manually pulling slider handle 206 so as to adjust the space for an electronic device (e.g., head-mounted display). In some embodiments, second shell 30 includes an electronic device accessory stop 302 and an electronic device accessory well or strap 304. Strap 304 may be adjusted to secure an electronic device accessory, e.g., a battery 3.

While certain embodiments discussed herein may have features that are particularly well-suited to storing and protecting a head-mounted display and accessories, it should be understood that cases described herein and their features may be applicable to store and protect other devices (e.g., other personal electronic devices) such as, for example headphones, PDAs (personal digital assistant), mobile phones, digital cameras, tablet PCs, smart watches, handheld game consoles, etc. Electronic device accessories are also not limited to a battery but may include earphones, earbuds, any types of cables, straps (e.g., smart watchbands), etc.

Case 10 may further include, on second shell 30, a zipper pull 306 as part of a zippered closure configuration. For instance, first teeth 208 on an edge of first shell 20 and second teeth 308 formed on an edge of second shell 30 may be meshed together or separated from each other by use of zipper pull 306. Accordingly, first and second shells 20, 30 may be open as shown in FIGS. 1 and 2, and closed as shown in FIGS. 3 and 4 by rotating shells 20, 30 relative to each other about their hinge connection.

Figure 3:
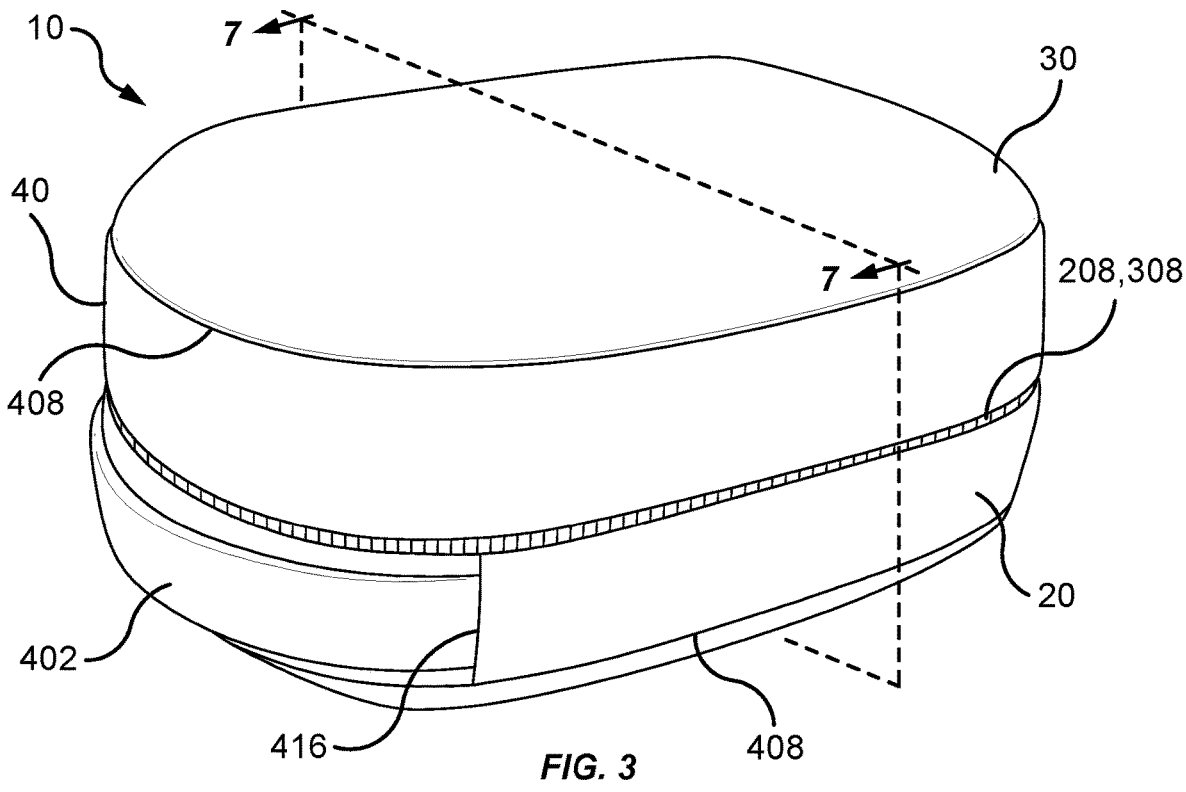
FIG. 3 shows a right perspective view of the case in a closed state.
Figure 4:
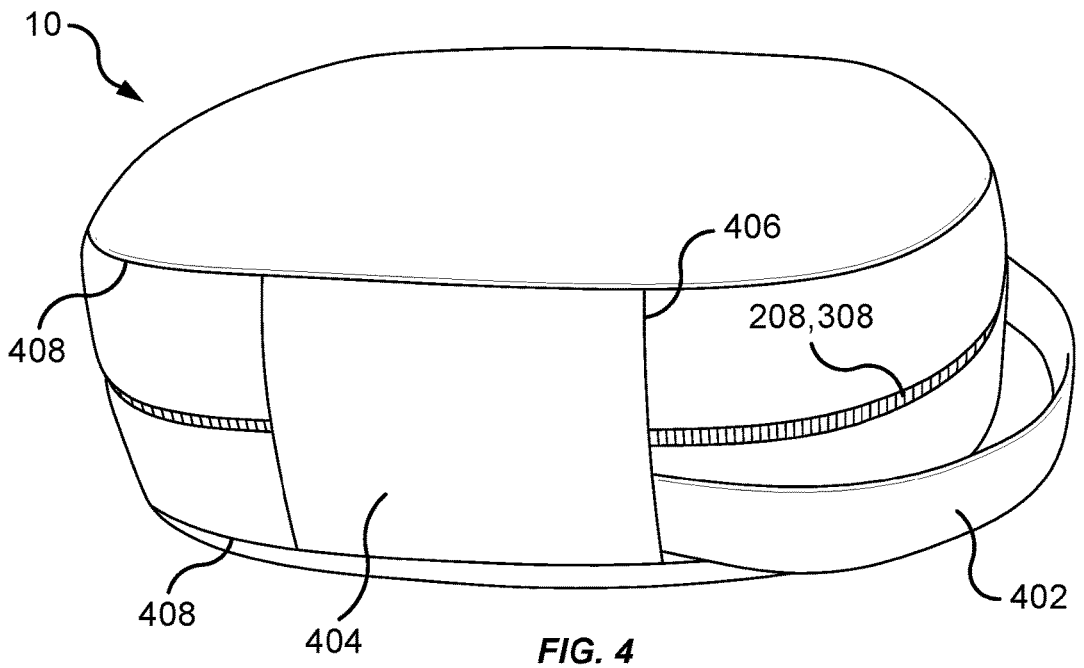
FIG. 4 shows a left perspective view of the case in a closed state.

Turning to FIGS. 3 and 4, perspective views of case 10 in a closed state are shown. As shown, first and second teeth 208 and 308 can be meshed by zipper pull 306 to secure the tight closure of case 10. The closed views of FIGS. 3 and 4 show an outer jacket 40 forming an entire outer portion of case 10. More specifically, jacket 40 is provided on each of first and second shells 20, 30, with first and second teeth 208 and 308 along the edge of each shell.

Jacket 40 may form a soft, yielding outer surface to case 10. For instance, an outer material of jacket 40 may be a flexible textile, and may be backed underneath by a soft, yielding material (e.g., batting, feathers, etc.). This soft exterior contributes an accessible and soft appearance and feel to case 10 that belies the strength and protection it provides.

In addition to contributing a soft and accessible look and feel to case 10, jacket 40 being formed of flexible and compressible materials allows it to absorb and dampen an external impact or vibration. Thus, the outermost surface of case 10 may change its surface shape variably while absorbing impact during transport or handling by a user, e.g., as shown in FIG. 7B. That is, during handling by a user, the thickness of case 10 may vary in areas where forces are applied by the user. Further, each shell, first and second shells 20, 30, may independently appear thicker or thinner than one another.

In some embodiments, jacket 40 may further include a hinge 404 integrally connecting outer jackets 40 of respective first and second shells 20, 30. Hinge 404 and outer jackets 40 may be formed of the same material. In some embodiments, jackets 40 and hinge 404 may be connected by stitching (e.g., stitching 408) to form a continuous outer appearance. That is, case 10 may appear as though one unitary jacket 40 covers the entire outer surface of case 10. In particular, in a circumstance in which case 10 includes first and second shells 20, 30 that are asymmetric to each other, differently shaped and formed jackets may be connected to each other.

In some embodiments, there may be a retractable strap or handle 402 connected to a first shell 20 side on jacket 40. As will be described further in detail, retractable handle or strap 402 can be manually pulled out in an extended position (FIG. 4) and automatically retracted to the original position or nominal position (FIG. 3) by a spring mechanism in the absence of an applied force. One end of handle 402 may be connected to case 10 under hinge 404, through a first opening or pocket 406. On the opposite side of hinge 404, a second pocket 416 may be integrally formed on jacket 40 to receive another end of retractable handle 402. When in the extended position, portions of retractable handle 402 may be extendable out from pockets 406, 416 to extend out retractable handle 402. On the other hand, when in the nominal position, the portions of retractable handle 402 may be retractable into pockets 406, 416 to move retractable handle 402 back. In addition, pockets 406, 416 can be located on first shell 20 or second shell 30.

Figure 5A:
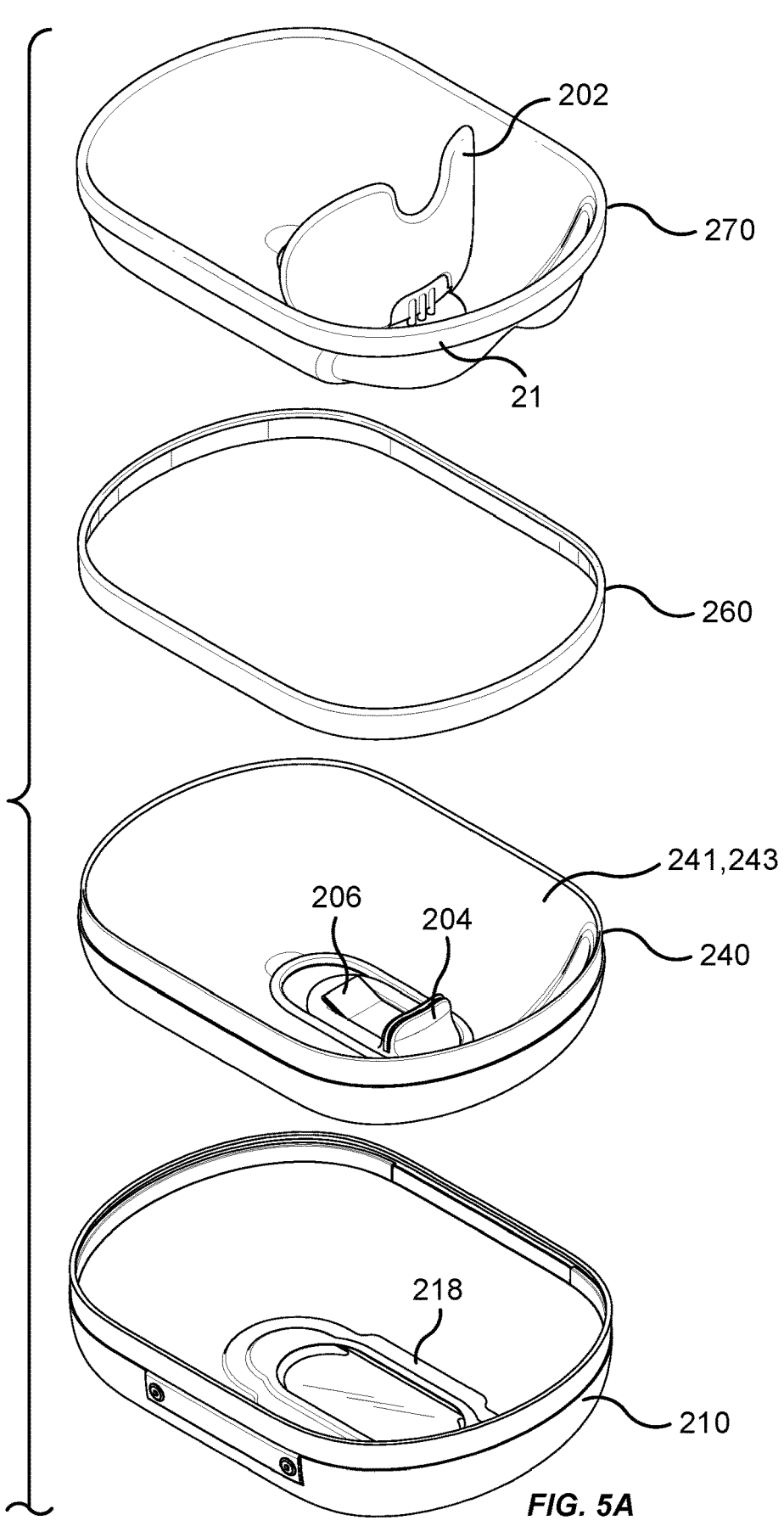
FIGS. 5A and 5B together show an exploded view of a first shell of the case, where
Figure 5B:
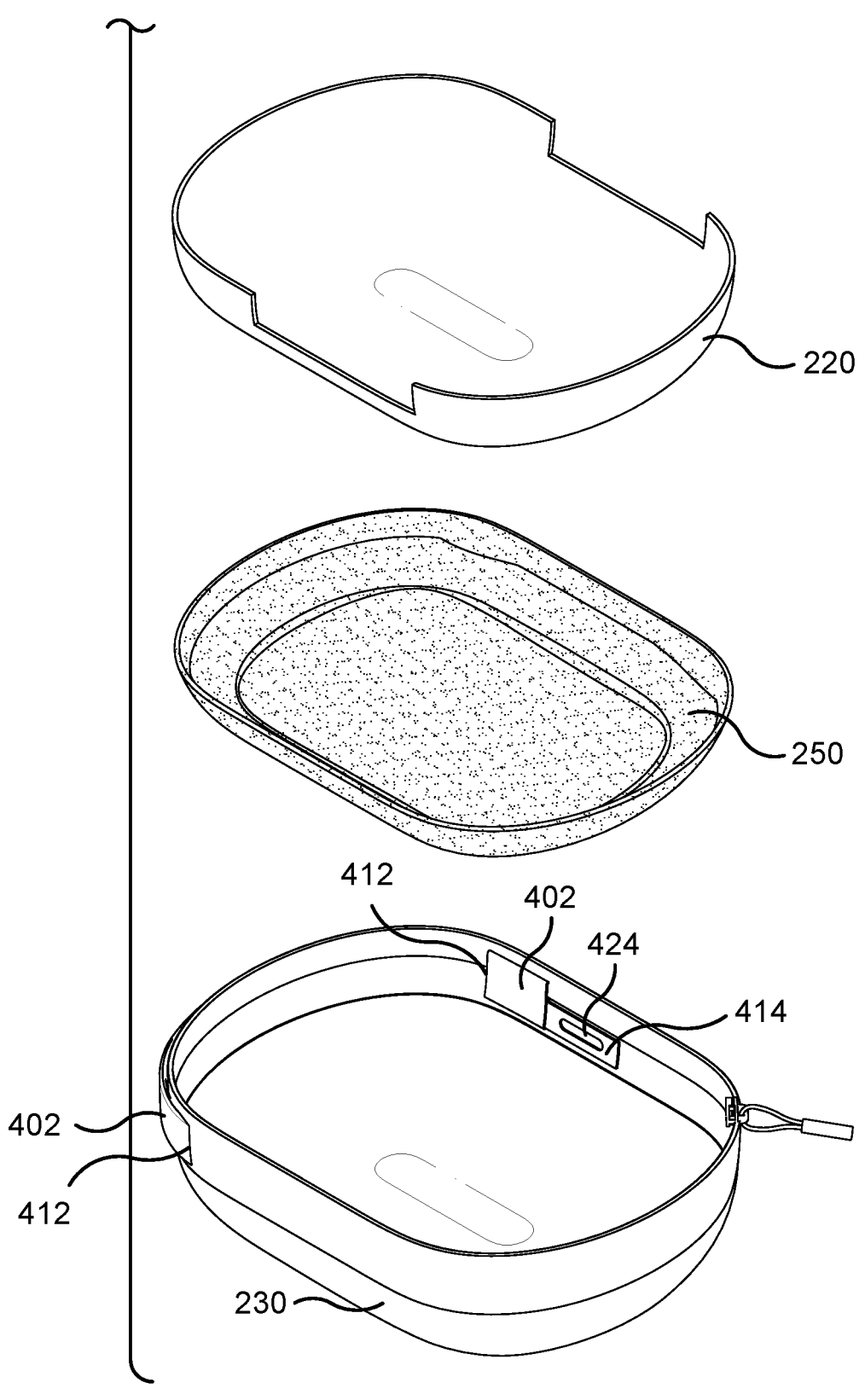

FIGS. 5A and 5B together show an exploded view of first shell 20. In particular, FIG. 5A shows an upper section of first shell 20, and FIG. 5B shows a lower section of first shell 20. In some embodiments, first shell 20 may include a rigid layer 210 formed with a concave inner surface and a convex outer surface, a foam layer 220 disposed on and covering the outer surface of rigid layer 210, batting 250 disposed on and covering foam layer 220 and a jacket layer 230 disposed on and covering the outer surface of foam layer 220.

Figure 6A:
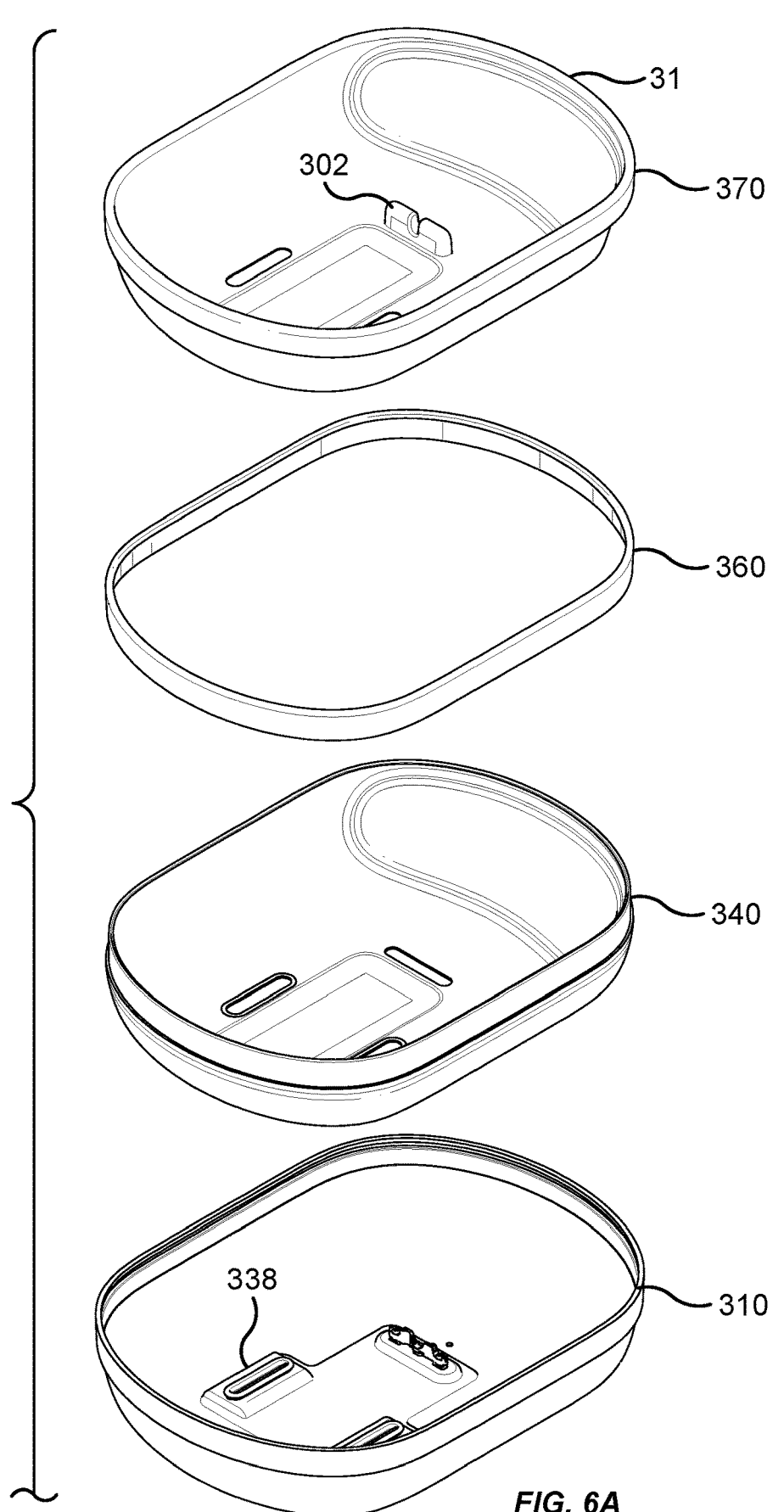
FIGS. 6A and 6B together show an exploded view of a second shell of the case, where
Figure 6B:
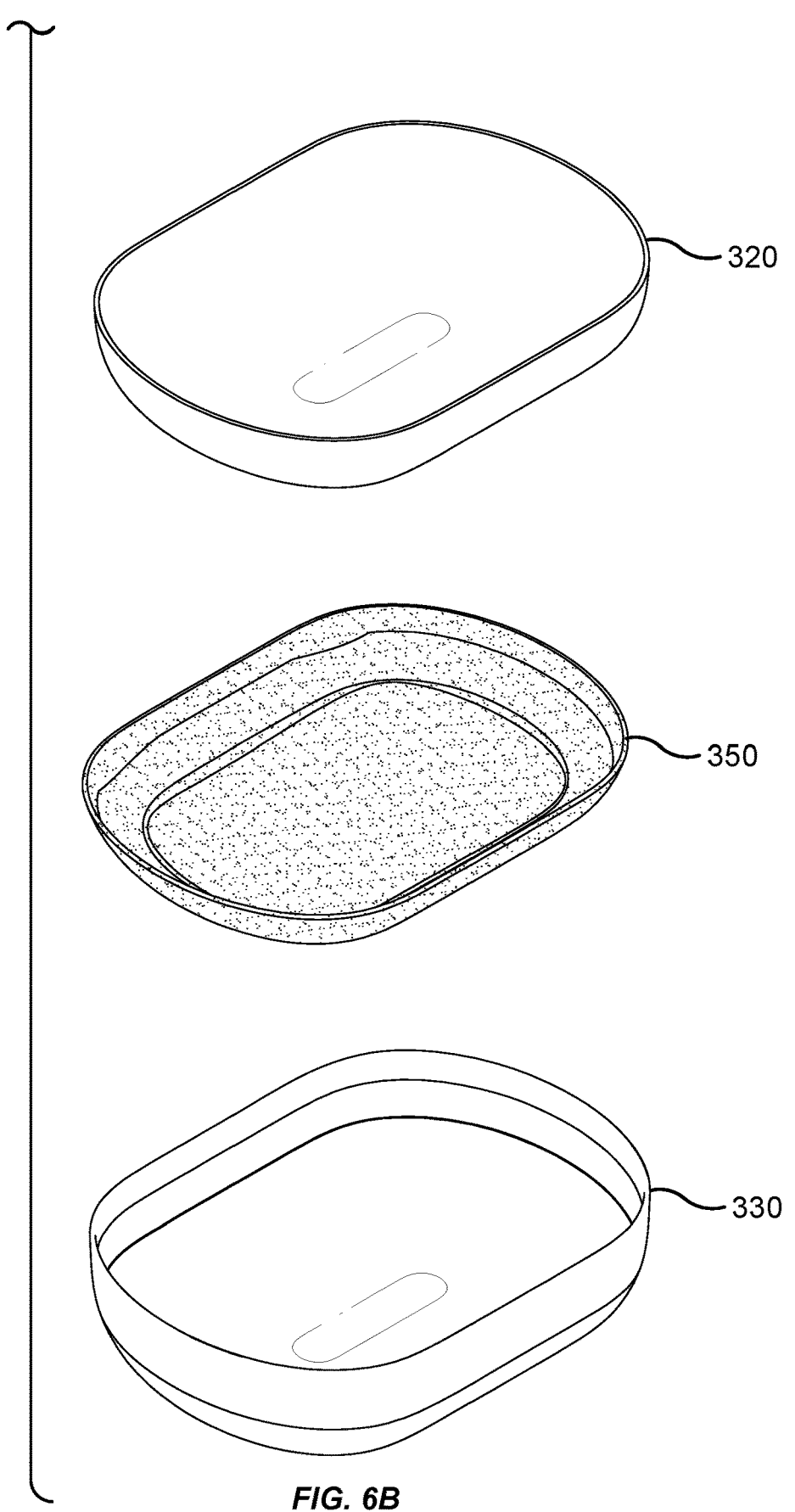

FIGS. 6A and 6B together show an exploded view of second shell 30 including a similar structure. In particular, FIG. 6A shows an upper section of second shell 30, and FIG. 6B shows a lower section of second shell 30. In some embodiments, second shell 30 may include a rigid layer 310 formed with a concave inner surface and a convex outer surface, a foam layer 320 disposed on and covering the outer surface of rigid layer 310, batting 350 disposed on and covering foam layer 320, and a jacket layer 330 disposed on and covering the outer surface of foam layer 320. The layered structure of second shell 30 is the same as that of first shell 20, and so the characteristics described with respect to the layers of one or the other apply to both.

In some embodiments, jacket layer 230 may correspond to outer jacket 40 described above. That is, jacket layer 230 may be a flexible textile, and may be backed underneath by batting 250 providing cushioning. This soft exterior contributes an accessible and soft appearance while providing increased protection. Batting 250 may be supported and enclosed between jacket layer 230 and an internal fabric that may be, for example, an inner fabric of the sort included in down jackets having battings/feathers therein. In some embodiments, the jacket layer 230 may be made of a nylon or polyester fabric.

In some embodiments, rigid layer 210 may be thermo-formed polycarbonate, and foam layer 220 may be formed of polyurethane. Foam layer 220 is a resilient, flexible and durable manufactured material, and rigid layer 210 is a tough, rigid, plastic material with high strength, stiffness, and impact resistance. Foam layer 220 is fixed and conforms to rigid layer 210 and thus rigid layer 210 imparts rigidity to foam layer 220. This helps to give foam layer 220 sufficient structure and resistance to absorb external impact while rigid layer 210 can protect shell 20 overall from internal deformation. For instance, a molded foam 240 disposed on an inner side of rigid layer 210 can maintain its shape during handling by a user.

Figure 7A:
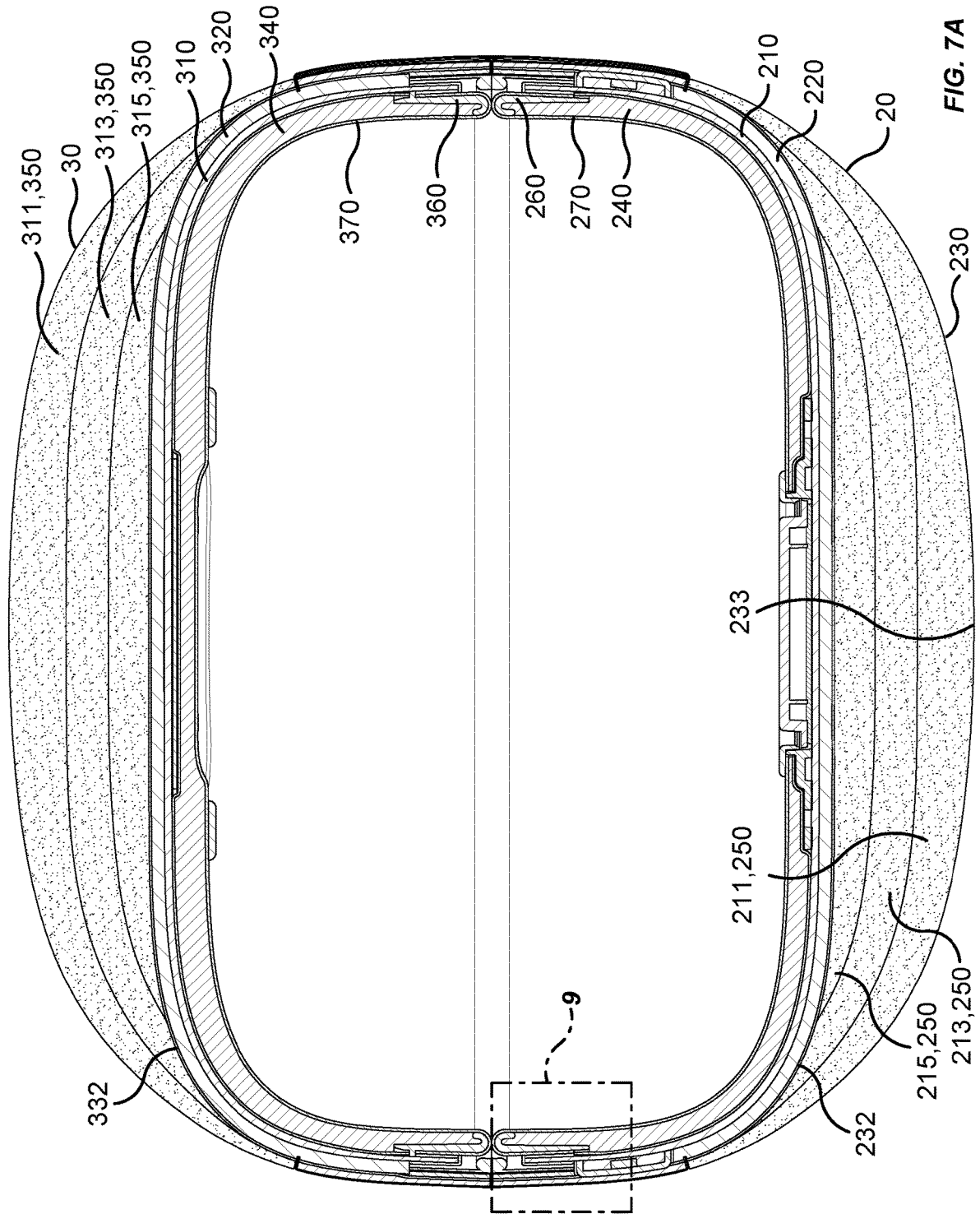
FIGS. 7A and 7B show cross-sectional views of the case taken along line 7-7 of FIG. 3, where
Figure 7B:
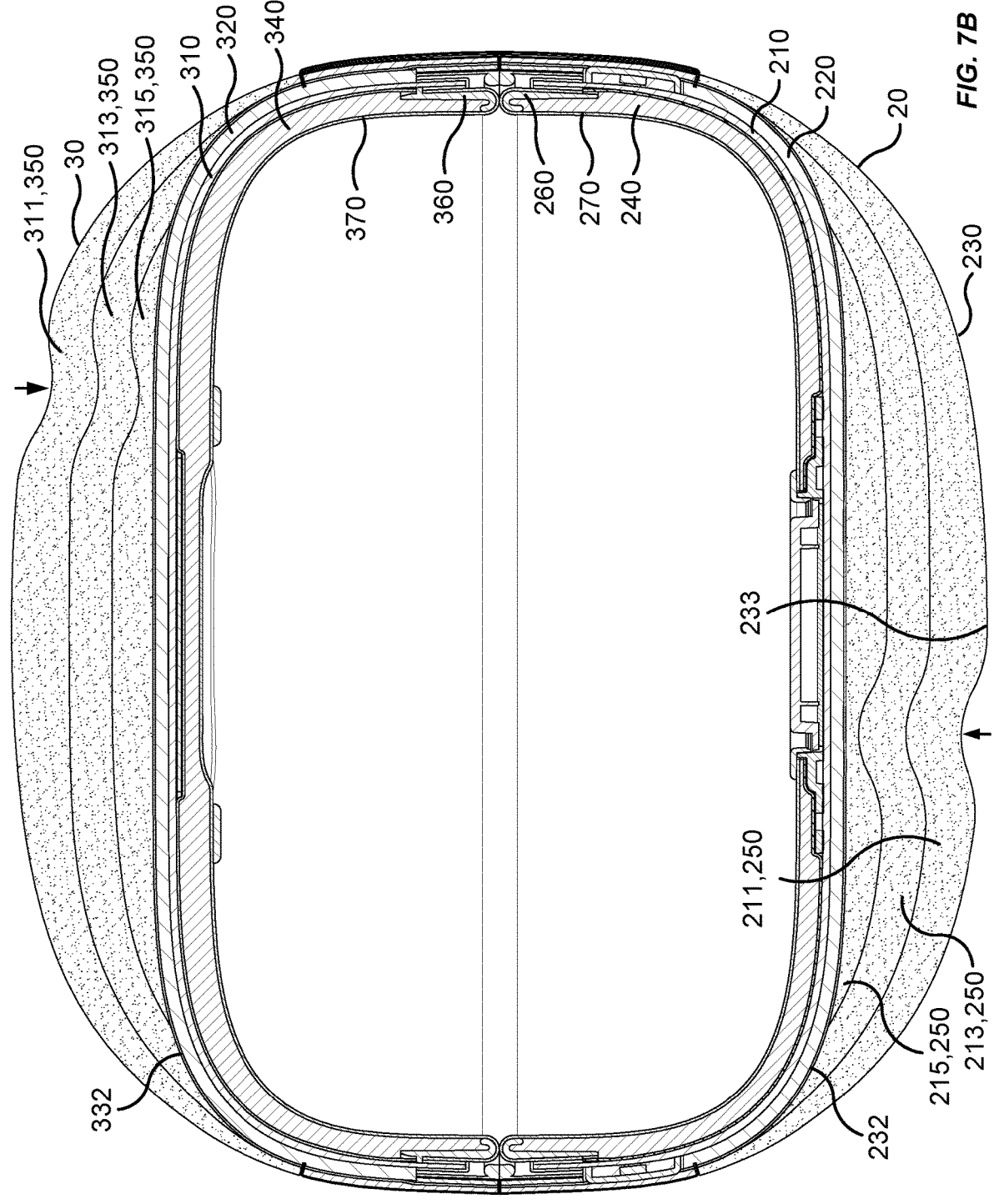

Further, referring to FIG. 7A, which shows a cross-sectional view of case 10 in FIG. 3 taken along line 7-7 thus showing stacked layers of each shell, batting 250 may include one or more batting layers 211, 213, 215. Each shell may further include a fabric layer 232 (e.g., a nonwoven fabric layer) disposed on foam layer 220 such that batting layer 215 is disposed on fabric layer 232 and batting layers 213, 211 disposed on batting layers 215, 213, respectively. Batting layers 211, 213, 215 are compressible and jacket layer 230 is flexible, such that the outermost surface of shell 20 yields when subjected to even low external pressure and thereby does not maintain a fixed shape during handling by a user as also described above. Batting or wadding 250 may be made of polyester, wool, and cotton fibers, commonly used in puffer jackets to provide similar compressible, puffiness effects. Others are made of silk fibers, cotton-wool blends, cotton-polyester blends, organic blends, bamboo batting, and recycled fibers.

For instance, FIG. 7A shows a cross-sectional view of case 10 in a nominal state, with no external force applied, and FIG. 7B shows case 10 of FIG. 7A in a compressed state. When the external force or forces are applied as shown in arrows, only the regions where the forces are applied may be compressed while non-affected regions on the outer surface of case 10 maintain their original shape.

In some embodiments, batting layers 211, 213, 215 together may have a nominal thickness that increases toward the middle of the outer surface of shell 20. Each layer of batting may be the same type or weight (e.g., 40-80 gram batting). In certain embodiments, 60-gram batting may be used for each layer 211, 213, 215. Varying the batting weight can adjust the thickness of batting which would further change the cushioning of the external layer of case 10. For example, 80 grams of batting would be thicker than 60 grams of batting and thus provide more cushioning. Batting will have a natural resilience and expand again after compression, such that when not subject to an external pressure it will maintain jacket layer 230 a distance away from foam layer 220. For example, batting layers 211, 213, 215 may be configured to space external jacket layer 230 away from foam layer 220 by at least, e.g., ¼ inch at its maximum (e.g., midpoint 233).

Referring back to FIGS. 7A and 7B, in some embodiments, each layer is closely disposed or attached to one another. In addition, the interior surface of molded foam 240 may have a shape that does not follow the shape of the inner surface of the rigid layer 210. The shape may include a pair of recesses 241, 243 (e.g., see FIG. 2) disposed at a front end 21, 31 of at least one of first and second shells 20, 30, away from retractable handle 402. Further, at an edge of molded foam 240, there may be an edge rim 260 on top of molded foam 240. In some embodiments, edge rim 260 may be made of a material more rigid than molded foam 240. Thus, edge rim 260 can provide extra strength and rigidity to molded foam 240. For instance, when case 10 is closed such that edges of shells 20, 30 are in contact with each other as shown in FIG. 7A, edge rim 260 of first shell 20 and an edge rim 360 of second shell 30 can reduce the transfer of a load to molded foams 240, 340, at least in part because edge rims 240, 360 cooperate with each other and with rigid layers 260, 310 to isolate and absorb external forces without significant internal deflection.

Figure 8A:
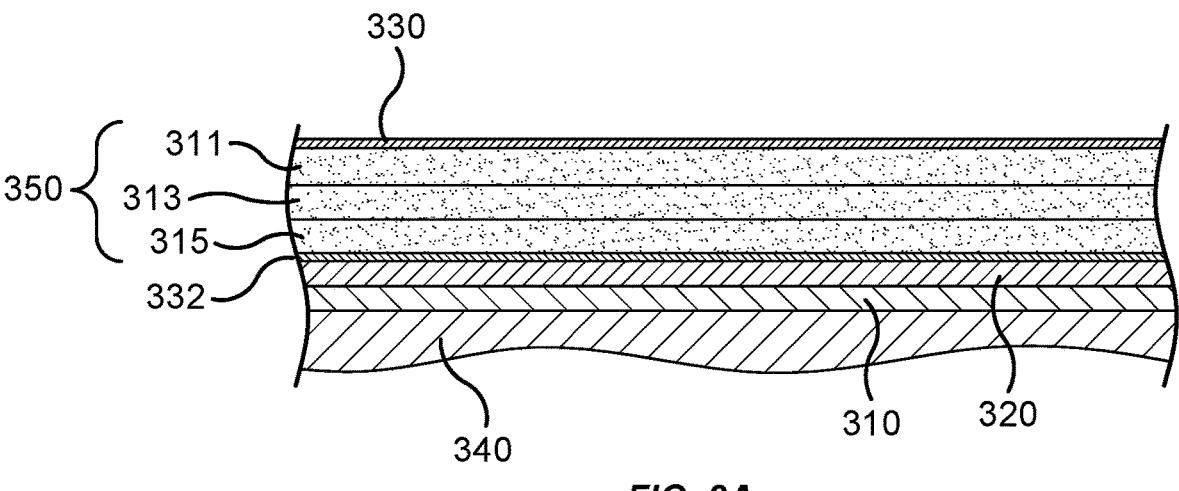
FIGS. 8A and 8B show cross-sectional partial schematic views of the case, where
Figure 8B:
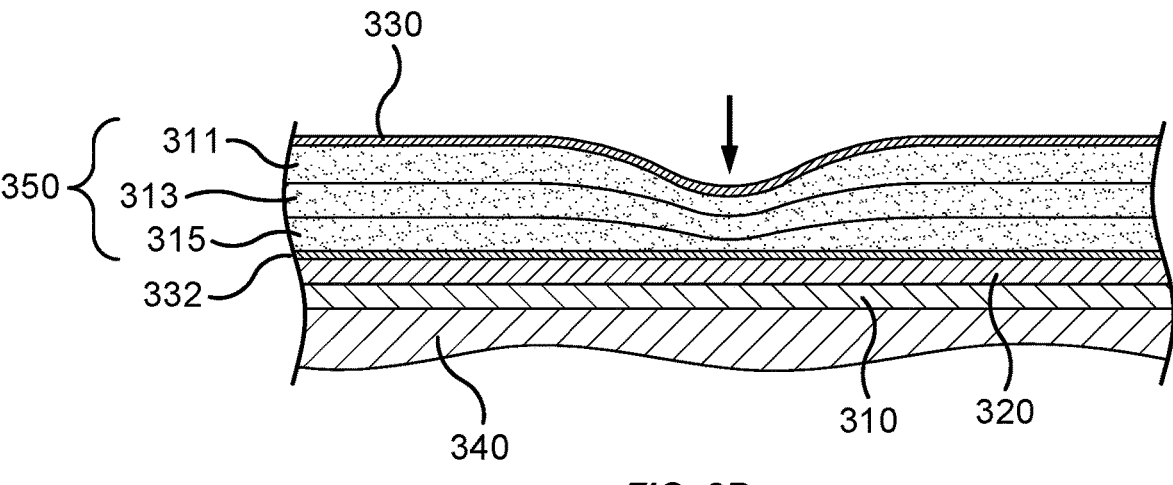

Turning to FIGS. 8A and 8B, where FIG. 8A which show schematic cross-sectional views of a portion of first shell 20 or second shell 30. For convenience elements shown in the schematic views are labeled as those of second shell 30, but it should be understood that the structure and function described applies equally to first shell 20. As shown, when an external load is applied to case 10 as indicated by the arrow in FIG. 8B, outer jacket layer 330 covering layers of batting 311, 313, 315 may be deformed in the direction for the load while an inner hard shell including rigid layer 310 may maintain its shape, protecting the softer interior molded foam layer 340 from deforming. In addition, fabric layer 332 covered under batting layers 311, 313, 315 and foam layer 320 covered under fabric layer 331 may deform slightly or may not deform, depending on the amount of load. In any event, molded foam 340, which forms an internal cavity of case 10, disposed under rigid layer 310 can be protected from the external load, thus protecting a product inside case 10. FIGS. 8A and 8B illustrate a load applied to second shell 30 as an example; second shell 20 may be deformed in the similar way when a load is applied thereto.

Figure 9:
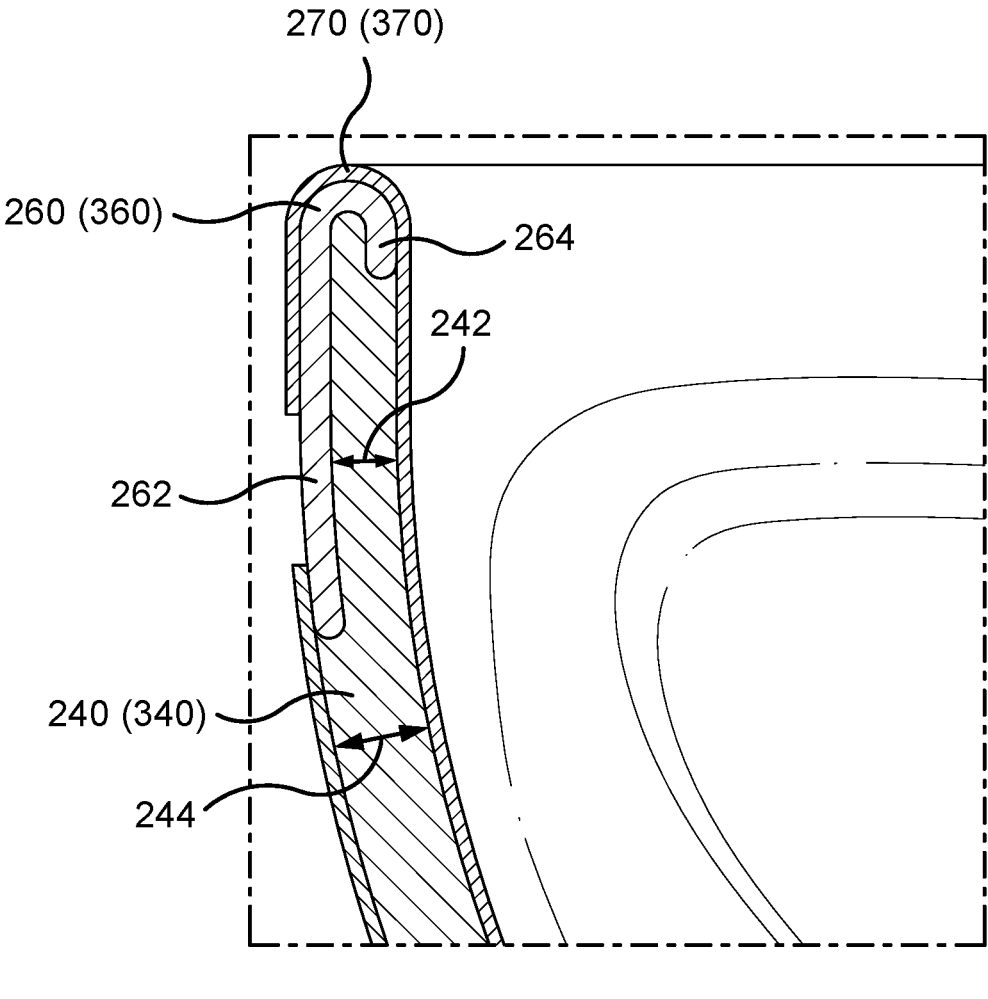
FIG. 9 shows a close-up view 9 of FIG. 7A.

Referring to FIG. 9, showing a close-up view 9 of FIG. 7A, edge rim 260 (or edge rim 360) may be disposed along the entire edge of molded foam 240 (or molded foam 340). For instance, in the illustrated embodiment, edge rim 260 is in a candy cane shape having an outer side 262 longer than an inner side 264, and the inner side and outer side meet at a curve forming a semicircle shape at the top. In certain embodiments, edge rim 260 and molded foam 240 may be pressed together to form one integrated body. For instance, during a molding process, pre-prepared edge rim 260 may be in a molding machine with materials for molded foam 240 when molding molded foam 240. In this way, edge rim 260 may become a part of molded foam 240 as one unitary body and provide rigidity all around the edge of molded foam 240. The shape of edge rim 260 (or edge rim 360) shown in the illustrated example helps to establish and maintain a close and clean edge between the different materials of edge rim 260 and molded foam 240. As will be discussed, the seam at these joined edges will be covered by internal fabric 270, but imperfections or significant separation at the seam could still show through the fabric, which can be unsightly and undesired. The candy cane shape of edge rim 260 allows a gradual thinning of molded foam 240 up toward the upper edge where it joins with edge rim 260, which the inventors have found reduces the tendency for foam 240 to pull away from edge rim 260 or otherwise to form a noticeable seam. Other shapes that can accommodate or promote a similar tapering in thickness of molded foam 240 toward its interface with edge rim 260 could also be used, such as, for example, a solid edge rim that tapers downward, or that tapers downward and outward, thereby allowing the space for molded foam to correspondingly taper upward without showing a bulge or seam relative to the surface of edge rim 260.

In some embodiments, an internal fabric 270 may cover the inner surface of molded foam 240 and the outer surface of edge rim 260 (e.g., outer side 262). Edge rim 260 not only enhances the strength and rigidity of molded foam 240 but, due to its particular shape, further allows internal fabric 270 to smoothly cover molded foam 240 as mentioned above. That is, no wrinkle or fabric folding occurs on the surface of molded foam 240 when covered by internal fabric 270 even at a joint portion where edge rim 260 and molded foam 240 meet. When dissimilar materials are joined or molded together (e.g., edge rim 260 and molded foam 240), it can in some cases cause a visible separation at the joint portion when covered by a fabric because one material may shrink during or after a molding process. Edge rim 260 and molded foam 240 according to embodiments having particular shapes as described above mitigate these undesirable problems. More specifically, with reference to FIG. 9, thickness 242 of molded foam 240 is thinner than overall thickness 244 of molded foam 240. For example, thickness 242 may be between 2 mm to 3 mm while thickness 244 may be between 3.5 mm to 5.5 mm. In a certain embodiment, thickness 242 may be 2.6 mm. The relationship between these two thicknesses may affect the final molded surfaces.

In certain embodiments, internal fabric 270 may be provided in the molding machine with edge rim 260 and materials for molded foam 240 together. Accordingly, molded foam 240, edge rim 260, and internal fabric 270 are molded together during a molding process as one integrated body. Further, as noted above, second shell 30 includes layers similar to those of first shell 20, including edge rim 360.

Referring back to FIG. 1, each shell of case 10 is configured to receive a product such as a head-mounted display (or other personal electronic device) and accessories thereof. In this example, first shell 20 may receive and store, e.g., head-mounted display 2, and second shell 30 may receive a battery 3. In addition, each shell may have an adjustable mechanism to adjust a receiving space and secure product head-mounted display 2 therein. FIGS. 10-15 illustrate first shell 20 having an adjustable mechanism for receiving a personal electronic device (e.g., head-mounted display 2). That is, first shell 20 has a mechanism that is configured to be adjustable to receive different sizes of electronic devices.

Figure 10:
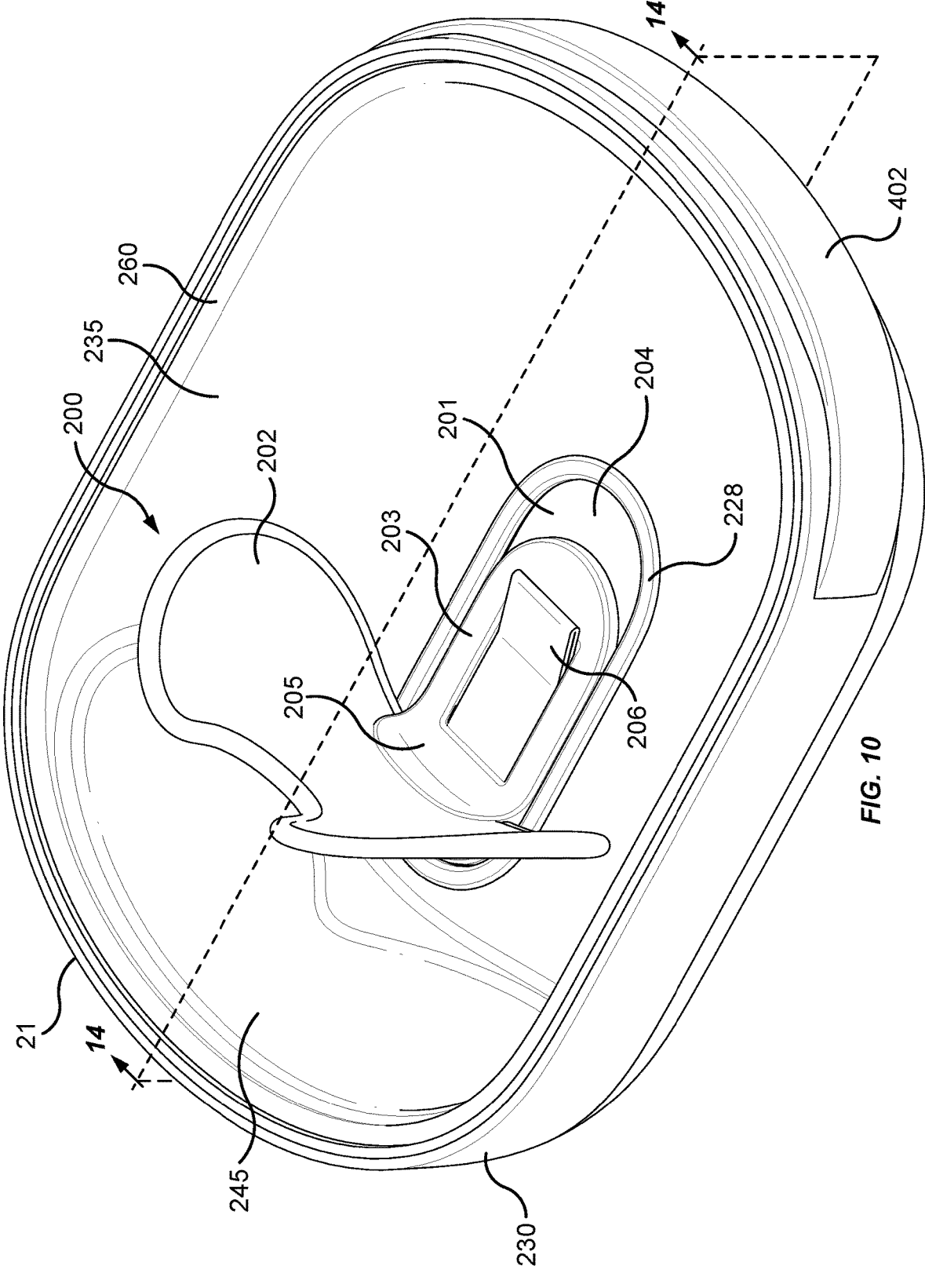
FIG. 10 shows a first position of a slider mechanism in the first shell of the case.
Figure 11:
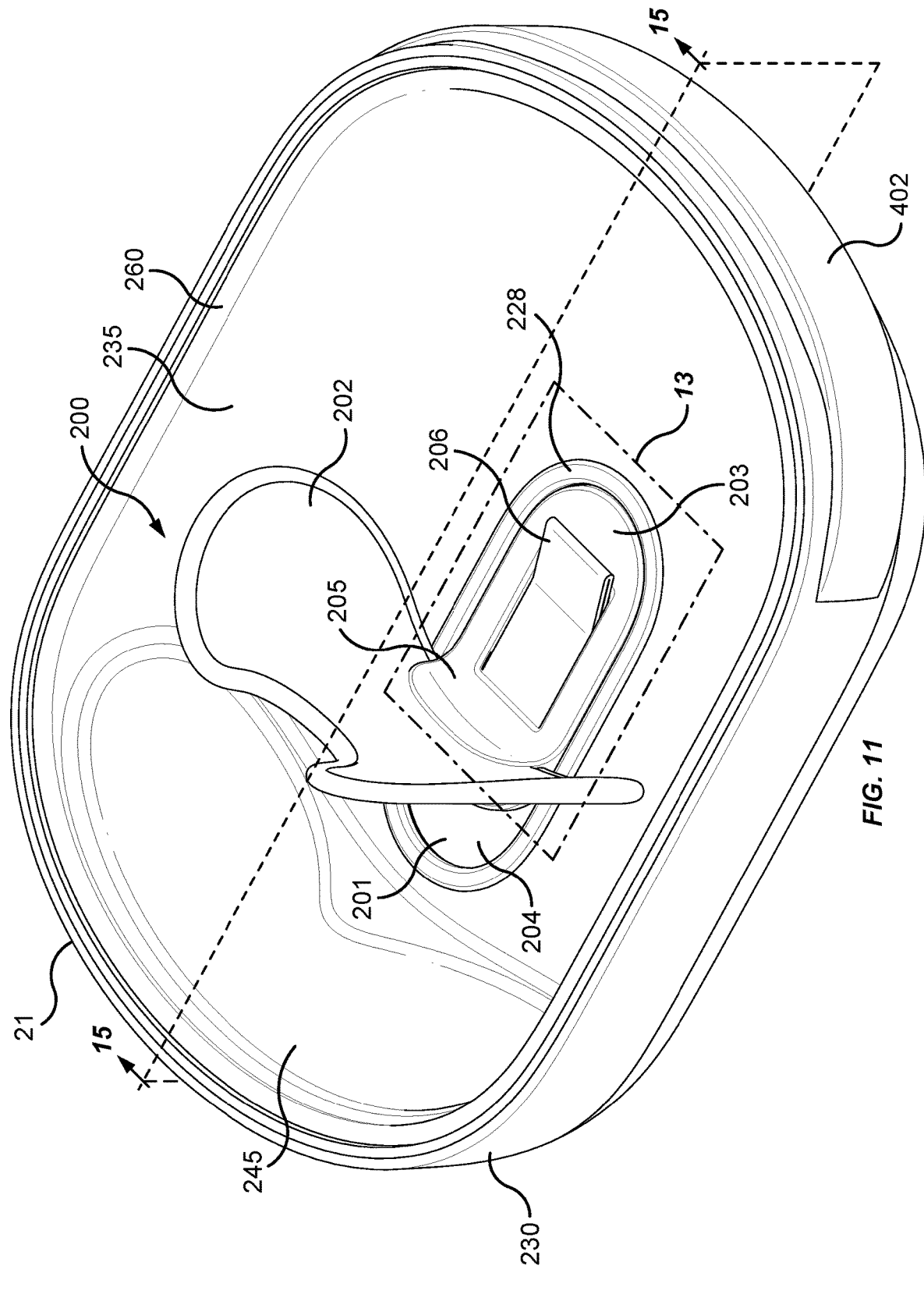
FIG. 11 shows a second position of the slider mechanism.

FIG. 10 shows a first position of the adjustable mechanism or slider mechanism 200 of first shell 20, and FIG. 11 shows a second position of slider mechanism 200. To focus on slider mechanism 200 on first shell 20 of case 10, second shell 30 is not shown in FIGS. 10 and 11 merely for convenience. In the second position, shield 202 and slider handle 206 are moved to the right relative to the first position to adjust a product-receiving space 245 between a front end 21 of shell 20 and shield 202. In some embodiments, molded foam 240 may from a concave boundary for product-receiving space 245, and shield 202 may form a convex boundary for product-receiving space 245. A user can pull slider handle 206 to the right or left to adjust the location of shield 202 based on the size of the electronic device. Also, when inserting the electronic device into product-receiving space 245, the user may pull slider handle 206 to provide enough space and slide back to secure the device. For example, a personal electronic device such as a head-mounted display may have modular facial fits (e.g., differently-sized light seals or other face-interface portion) provided with purchase of the head-mounted display such that a user can select the one with the right facial fit for their personal use. In addition, slider mechanism 200 can fit different types of electronic devices by adjusting receiving space 245.

Figure 12:
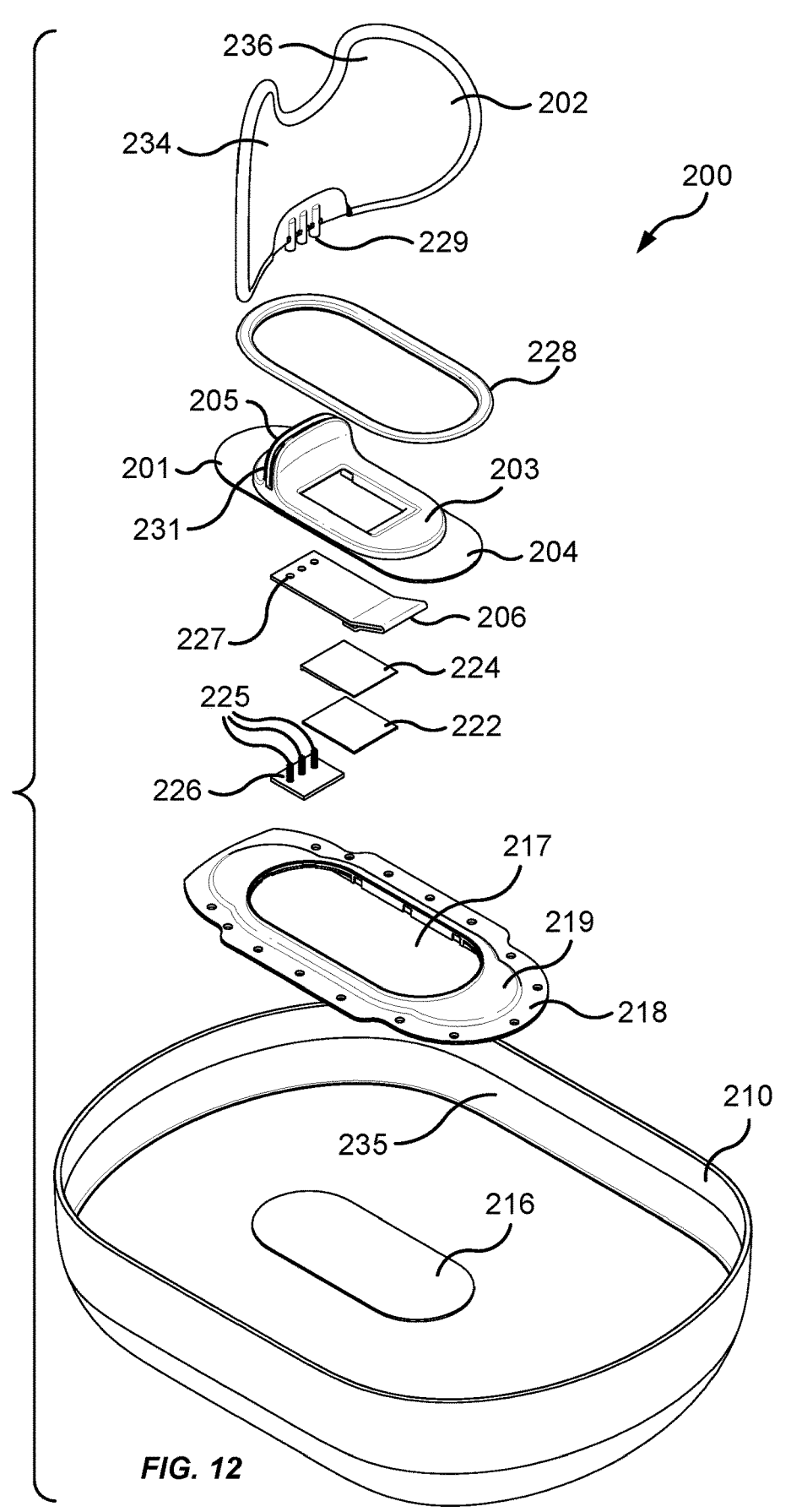
FIG. 12 shows an exploded view of the slider mechanism of the first shell.

Turning to FIG. 12, showing an exploded view, slider mechanism 200 includes a first attachment mechanism 216 fixed onto rigid layer 210 of first shell 20. Similar to FIGS. 10 and 11, FIG. 12 focuses on slider mechanism provided on first shell 20 for purpose of illustration, such that second shell 30 is not shown. In addition, other layers of first shell 20 such as outer jacket or jacket layer 230 and batting 250, which are independent from slider mechanism 200, and molded foam 240 disposed on rigid layer 210 are omitted from this figure merely for convenience. Around first attachment mechanism 216, a slide base 218 having a ring shape is disposed. For instance, slide base 218 may be riveted to rigid layer 210 as an anchor point or mechanical ground for slider mechanism 200. Slide base 218 may have an opening 217 through which slider 204 may fit and may form a sliding track 219 along sides of the closed shape. Slider 204 may include a lower slider portion 201 partially disposed under slide base 218 and within sliding track 219 and an upper slider portion 203 extending from lower slider portion 201 and exposed out through opening 217.

In some embodiments, slider 204 may be movably coupled to slide base 218 and constrained to translate along a straight line by a portion thereof sliding within sliding track 219. Thus, while slide base 218 is secured on rigid layer 210, slider 204, slider handle 206, and shield 202 makes a linear movement and the constraints on motion of slider 204 constrains the motion of shield 202. For instance, linear displacement of slider 204 may be constrained by the movement of upper slider portion 203 within opening 217. That is, slider handle 206 can be secured at any of multiple positions relative to slide base 218, such that shield 202 can similarly be held in position at any of multiple positions relative to slide base 218. Further, shield 202 may be movably connected to slide base 218 by its fixed connection to slider 204, and slider handle 206 may be fixed to slider 204. In some embodiments, shield 202 may extend laterally toward side walls 235 of case 10, and lateral extents of shield 202 may be spaced away from side walls 235. In some embodiments, shield 202 may be temporarily and repeatably fixable at any of multiple positions relative to the mechanical ground (e.g., slide base 218). Accordingly, shield 202 does not move laterally relative to the mechanical ground when fixed relative thereto, and shield 202 can be moved laterally relative to the mechanical ground when not so fixed.

Slider mechanism 200 may further include a second attachment mechanism 222 disposed on the lower side of slider handle 206 and facing first attachment mechanism 216. First and second attachment mechanisms 216, 222 are configured to be removably fixable to each other when they meet, and can be detached by pulling up slider handle 206. In certain embodiments, first and second attachment mechanisms 216, 222 may be hook-and-loop fasteners, e.g., first attachment mechanism 216 being hooks and second attachment mechanism 222 being loops, or vice versa. When second attachment mechanism 222 is coupled to first attachment mechanism 216, slider handle 206 can be in the secured position. On the other hand, when second attachment mechanism 222 is not coupled to first attachment mechanism 216, slider handle 206 can be in an unsecured position (e.g., free of linear motion).

In some embodiments, first attachment mechanism 216 has a greater surface area than second attachment mechanism 222. Thus, when a user pulls slider handle 206 from first position to second position (while first and second attachment mechanisms 216, 222 are detached from each other), as shown in FIGS. 10 and 11 or FIGS. 14 and 15, second attachment mechanism 222 moving along with slider handle 206 can be fastened at the corresponding position on first attachment mechanism 216.

Figure 13:
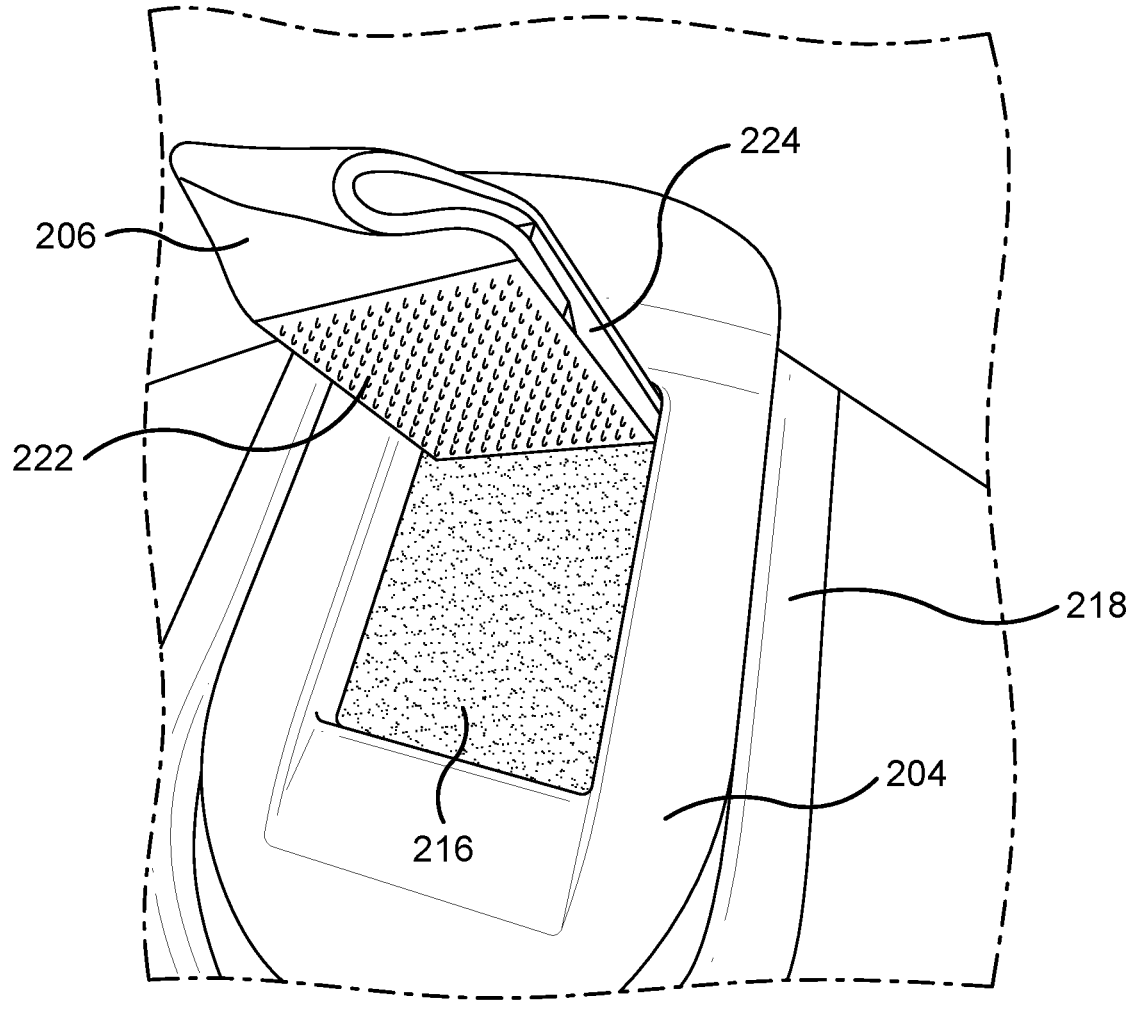
FIG. 13 shows a close-up view 13 of FIG. 11.

Referring to FIG. 13, while first attachment mechanism 216 is fixed on rigid layer 210, a user may pull up on a pull tab (e.g., slider handle 206) to which second attachment mechanism 222 is coupled to thereby detach second attachment mechanism 222 from first attachment mechanism 216, thereby freeing slider 204 to be slid forward or rearward before being reattached and securing slider 204 in place relative to first attachment mechanism 216 (and rigid layer 210). Since second attachment mechanism 222 needs to be detached and reattached in a different position on first attachment mechanism 216, second attachment mechanism 222 has a smaller surface area than first attachment mechanism 216 to attach on any portion of second attachment mechanism 222, within the constraints of the forward-and-rearward motion extents possible within slide base 218.

In some embodiments, slider handle 206 may be further provided with a first stop block 224 and a second stop block 226 each made of a rigid material. Stop block 224 may be wrapped inside slider handle 206 directly above but separated from second attachment mechanism 222. First stop block 224 may have a surface area corresponding to that of second attachment mechanism 222. Second stop block 226 may be positioned adjacent and abutting first stop block 224 toward the front end of shell 20. This configuration allows buckling of slider handle 206 when second attachment mechanism 222 is attached on first attachment mechanism 216, by two rigid stop blocks supporting and inhibiting slider handle 206 from bending.

In some embodiments, second stop block 226 may be coupled to shield 202. For instance, second stop block 226 may be provided with a fastening mechanism 225, e.g., screws, passing through holes 227 formed on slider handle 206 toward the front end of shell 20 and fastened to a respective receiving portion 229, e.g., threaded holes, formed at the bottom middle of shield 202. The bottom middle portion of shield 202 may be fitted into a groove 231 formed on a shield-holding portion 205 of slider 204. In some embodiments, shield-holding portion 205 protrudes upwardly from upper slider portion 203, and forms groove 231 to which shield 202 can be coupled to slider 204 and slider handle 206 via second stop block 226. In addition, shield 202 may be connected to slide base 218 at a central position thereof, and may have side wings 234, 236 extending laterally over and beyond slide base 218 (see, e.g., FIGS. 10 and 11).

As described above, stop block 224 may have a surface area that corresponds to second attachment mechanism 222 (see FIG. 13), each coupled to slider handle 206. First and second stop blocks 224, 226, buttress each other, while second stop block 226 is fixedly attached to slider 204. This configuration allows slider handle 206 to move between the first and second positions, or any position in between, and prevents further movement of slider 204 without creating buckling of slider handle 206. When slider handle 206 is set at a desired position, load applied to shield 202 or slider 204 is not transmitted (or is reduced) to slider handle 206 and attachment mechanisms 216, 222 by two stop blocks 224, 226 buttressing or acting on each other via action and reaction forces. That is, stop blocks 224, 226 may move along with slider 204 in accordance with slider handle 206 (when unconstrained), and when a user secures the slider position by engaging first and second attachment mechanisms 216, 222 (when constrained), stop blocks 224, 226 can prevent slider 204 from moving and further prevent buckling, folding, and peeling of slider handle 206. Thus the movement of shield 202 can be secured when the two attachment mechanisms 216, 222 are coupled.

Stop blocks 224, 226 provide a robust connection interface to structures of slider mechanism 200. As described above, shield 202 may be oriented in an upright configuration and have side wings 234, 236 extending laterally. Further, shield 202 may be relatively thin thus potentially deformable when an external force is applied thereto. Shield 202 thus is prone to receive external forces and torque at its edge and base, respectively or both. Therefore, it is important to provide a sturdy connection and structure between shield 202 and slider 204 in a low profile (since space in a case is at a premium) yet with an adequate cantilever to increase the rigidity of the shield. Furthermore, slider mechanism 200 described herein allows a user to easily and intuitively change the position of shield 202 to adjust product-receiving space 245, and further allows the user to easily release shield 202 from the fixed position.

Due to the foregoing configuration, a cantilever effect can be achieved when an external force transmitted against shield 202 by head-mounted display 2 is transmitted to a bottom of the shield 202, which is rigidly connected to second stop block 226 and slider 204. Second stop block 226 can be in turn pressed against first stop block 224 which is secured in position when first and second attachment mechanisms 216, 222 are coupled to each other. Thus, the external force of head-mounted display 2 against the shield 202 is met with an equal and opposite force, preventing movement of the shield, which stays rigidly in place.

Figure 14:
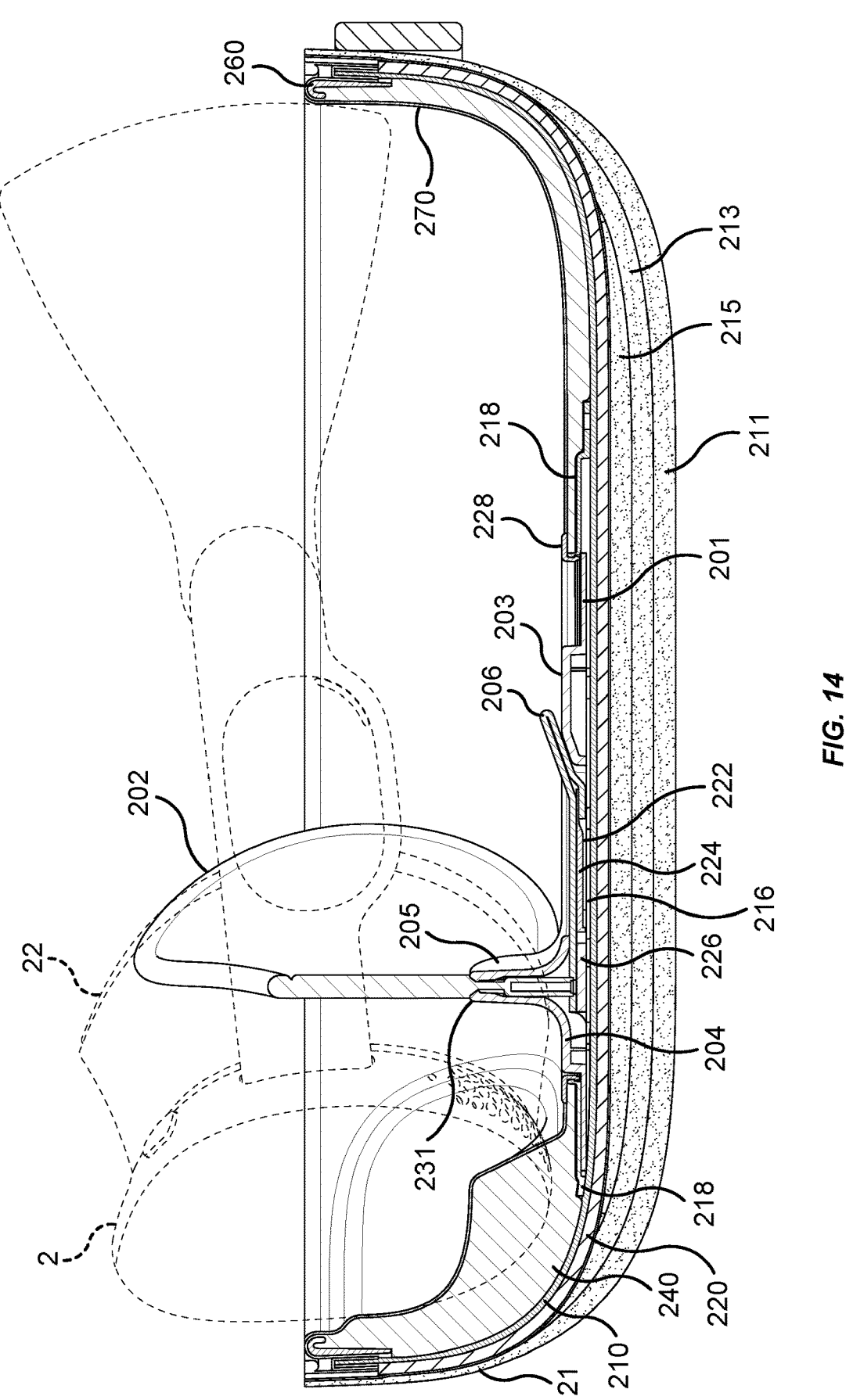
FIG. 14 shows a cross-sectional view of the slider mechanism of the first shell taken along line 14-14 of FIG. 10.
Figure 15:
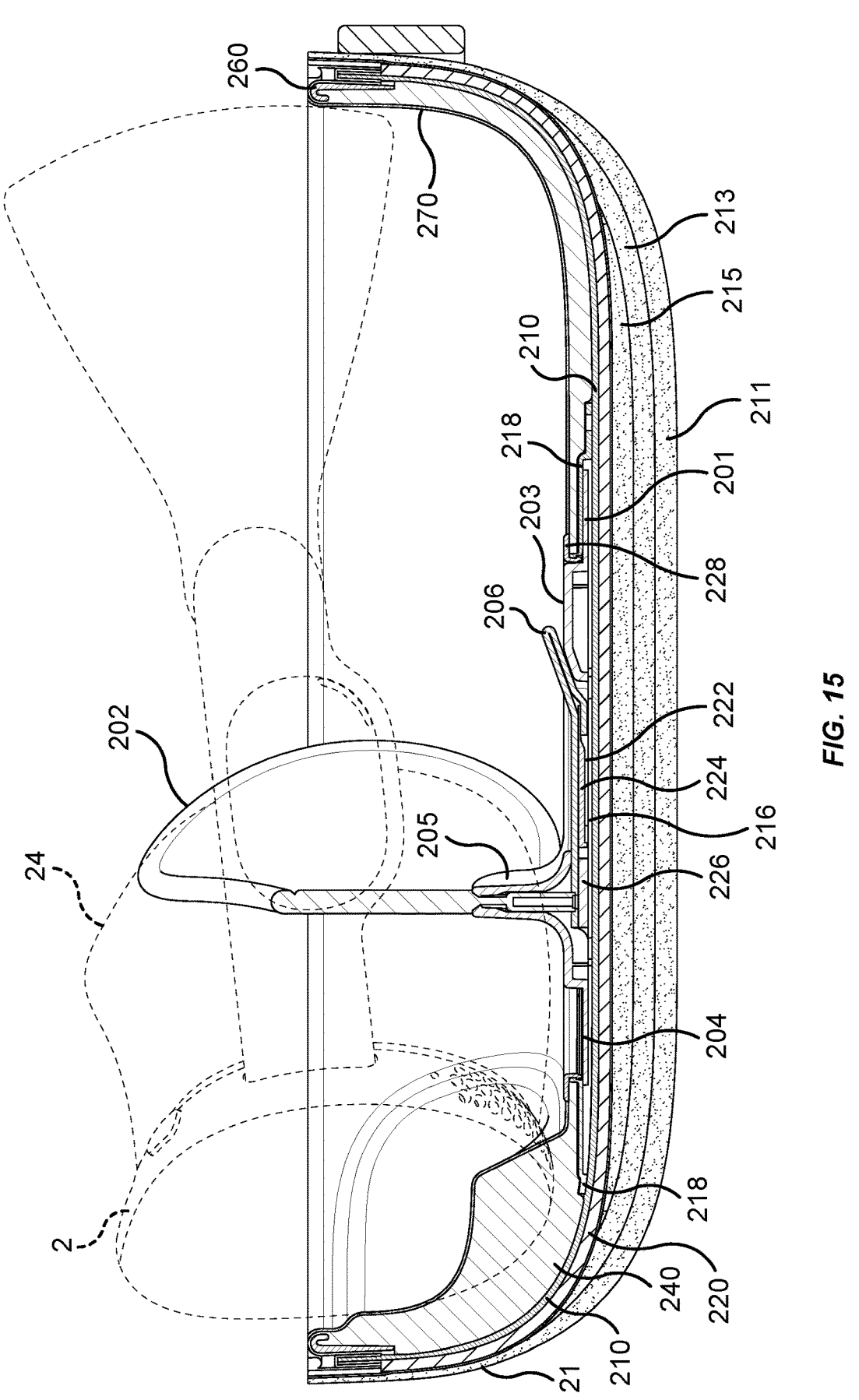
FIG. 15 shows a cross-sectional view of the slider mechanism of the first shell taken along line 15-15 of FIG. 11.

FIGS. 14 and 15 illustrate a first facial fit 22 assembled to head-mounted display 2 secured in the first position, and a second facial fit 24 assembled to head-mounted display 2 secured in the second position, respectively. With configurations and arrangements of case 10 described herein, it is possible to secure a head-mounted display device having modular and differently-sized parts (e.g., different sized light seals or other face-fit interfaces), thus allowing a single case to effectively support a wide range of differently-sized assembled devices, thereby promoting user satisfaction and reducing complexity in producing and stocking cases.

In some embodiments, with reference to FIGS. 10-15, slider mechanism 200 further includes a trim ring 228 configured to secure and seal slider 204. Trim ring 228 may be part of slide base 218, together securing slider mechanism 200, particularly slider 204, to rigid layer 210.

Figures 16A, 16B, 16C, 16D:
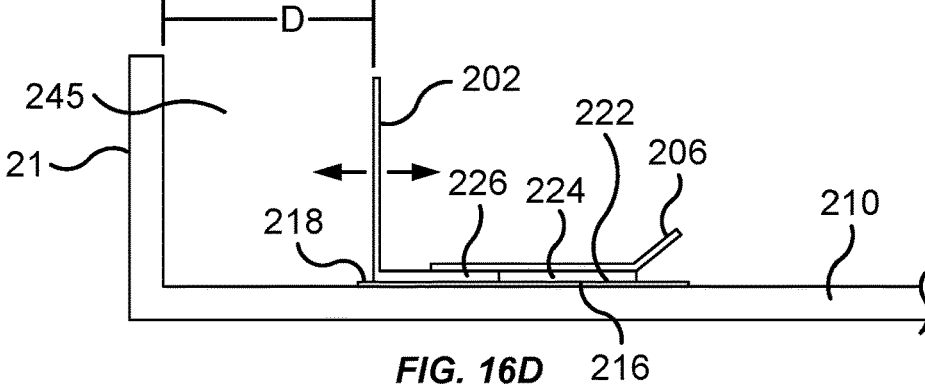
FIGS. 16A-16D show cross-sectional simplified schematic views of the slider mechanism, where
Figure 17:
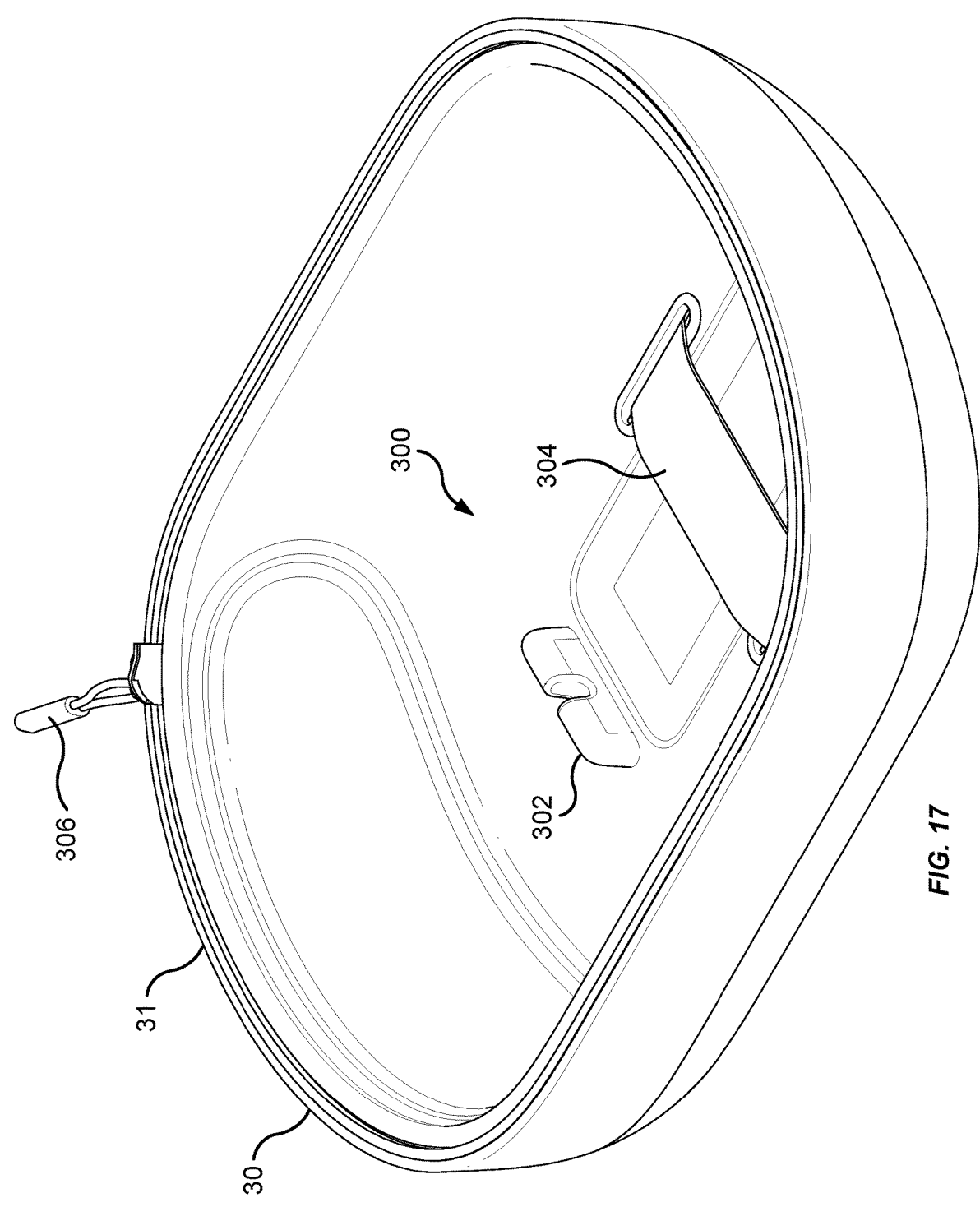
FIG. 17 shows an electronic device accessory compartment in the second shell of the case.
Figure 18:
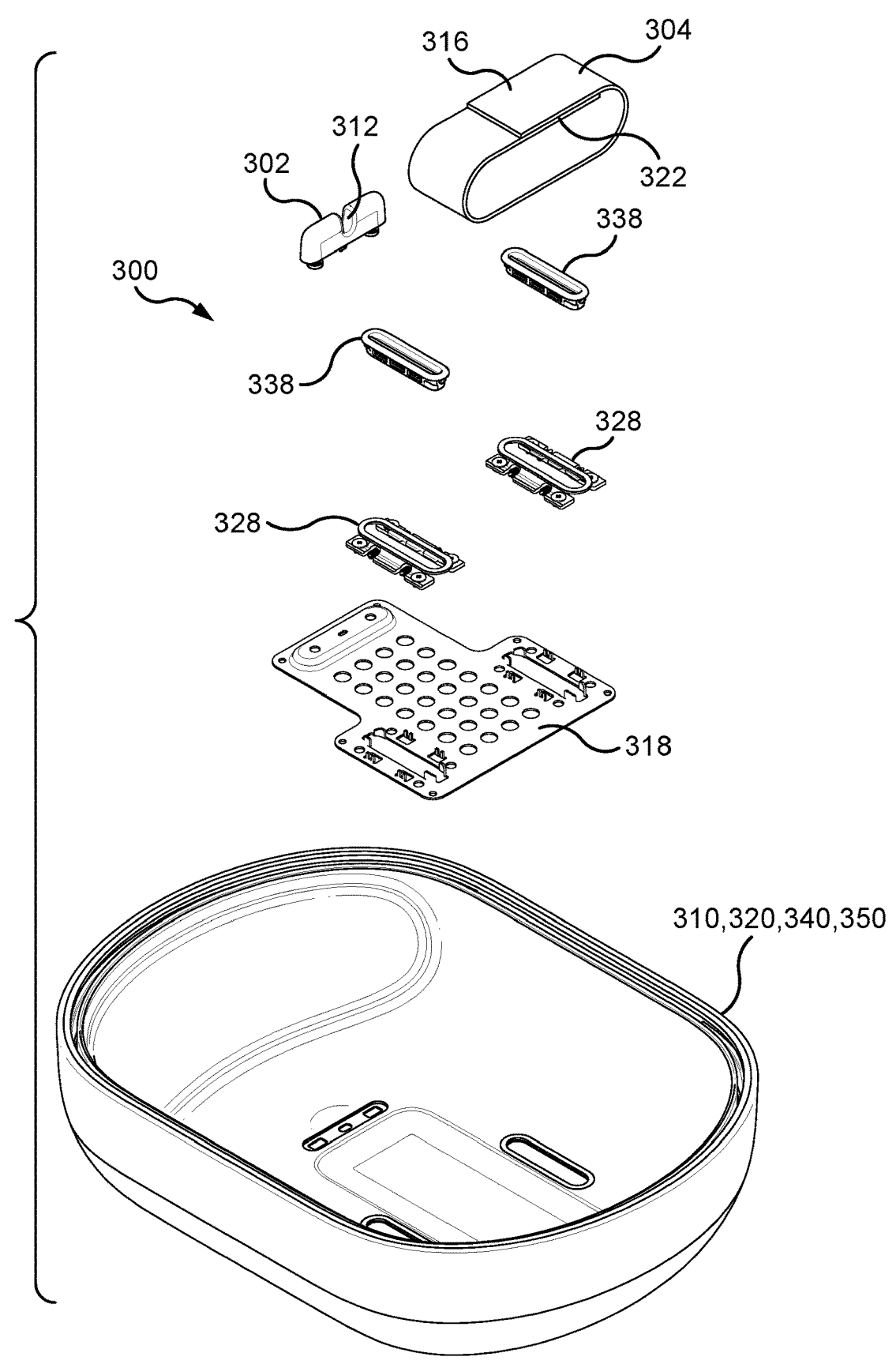
FIG. 18 shows an exploded view of the electronic device accessory compartment.

FIGS. 16A-16D show simplified schematic views of slider mechanism 200 to further illustrate motion and control thereof. Therefore, some of elements of shell 20, e.g., rigid layer 210, foam layer 220, batting 250, jacket layer 230, etc., are omitted for clarity. Turning to FIG. 16A, shield 202 is displaced relatively further away from front end 21, in the case of, for example, accommodating a relatively larger head-mounted display 2, such that shield 202 is in a second position (farther from front end 21), similar to that shown in FIGS. 11 and 15. Slider mechanism 200 in FIG. 16A is secured to slider base 218 as the mechanical ground. First and second stop blocks 224, 226 abut so as to act on an external load applied to shield 202 (e.g., action and reaction force, as described above).

FIG. 16B shows slider mechanism 200 unattached/unsecured as lifting up slider handle 206 upwardly and toward front end 21. A user can simply lift up handle 206 to release first and second attachment mechanism 216, 222. The first attachment mechanism 216 may be secured on the mechanical ground with slider base 218, and the second attachment mechanism 222 may be secured on slider handle 206. In addition, and as described above, first attachment mechanism 216 may have a surface area (or length in the direction of travel) greater than that of second attachment mechanism 222. In particular, the length of first mechanism 216 may be greater than that of second mechanism 222 in the sliding direction. Accordingly, as will be described below with reference to FIG. 16D, second attachment mechanism 222 may slide and attach to first attachment mechanism 216 anywhere within that length. When slider handle 206 is unsecured, slider handle 206 can be manipulated to slide shield 202 relative to slider base 218, e.g., slider handle 206 can be unsecured by a pulling force pulling slider handle 206 in a direction away from slider base 218 and first shell 20. Here, two stop blocks 224, 226 are no longer in contact as first stop block 224 is lifted up with handle 206 while second stop block 226 remains in its position. Thus, an external force applied to slider handle 206 or shield 202 may slide shield 202 in a direction the force is applied.

FIG. 16C schematically shows that slider mechanism 200 can be manipulated so that shield 202 is moved toward front end 21 in a first position (closer to front end 21), similar to that shown in FIGS. 10 and 14. Between FIG. 16A and FIG. 16C, the distance D between shield 202 and front end 21 is changed, e.g., the distance D between shield 202 and front end 21 is reduced in FIG. 16C as the position of shield 202 is changed. As indicated by two arrows pointing opposite directions, shield 202 can slide in the opposite directions to adjust the distance D and thus receiving space 245.

Turning to FIG. 16D, slider mechanism 200 is in the first position where slider handle 206 and shield 202 are secured by two attachment mechanisms 216, 222 described above. Once again, two stop blocks 224, 226 are arranged adjacent each other for sustaining slider handle 206 and shield 202 from moving. Second stop block 226 acts as a support for the cantilever effect of shield 202. As described with reference to FIGS. 16A-16D, slider mechanism 200 enables a user to easily adjust receiving space 245 according to the user facial fit size of, e.g., head-mounted display, by opening up receiving space 245 to provide enough space for the user device and by closing in to tightly secure the user device.

FIGS. 16A-16D show two positions as an example, however, a user can manipulate slider handle 106 to secure any of multiple positions within the first and second positions. Thus, shield 202 can similarly be held in position at any of multiple positions relative to slide base 218 to adjust receiving space 245. Each of the multiple positions at which shield 202 can be held may define a different distance between shield 202 and front end 21 of first shell 20, thereby defining a different size for product-receiving space 245.

Figure 19:
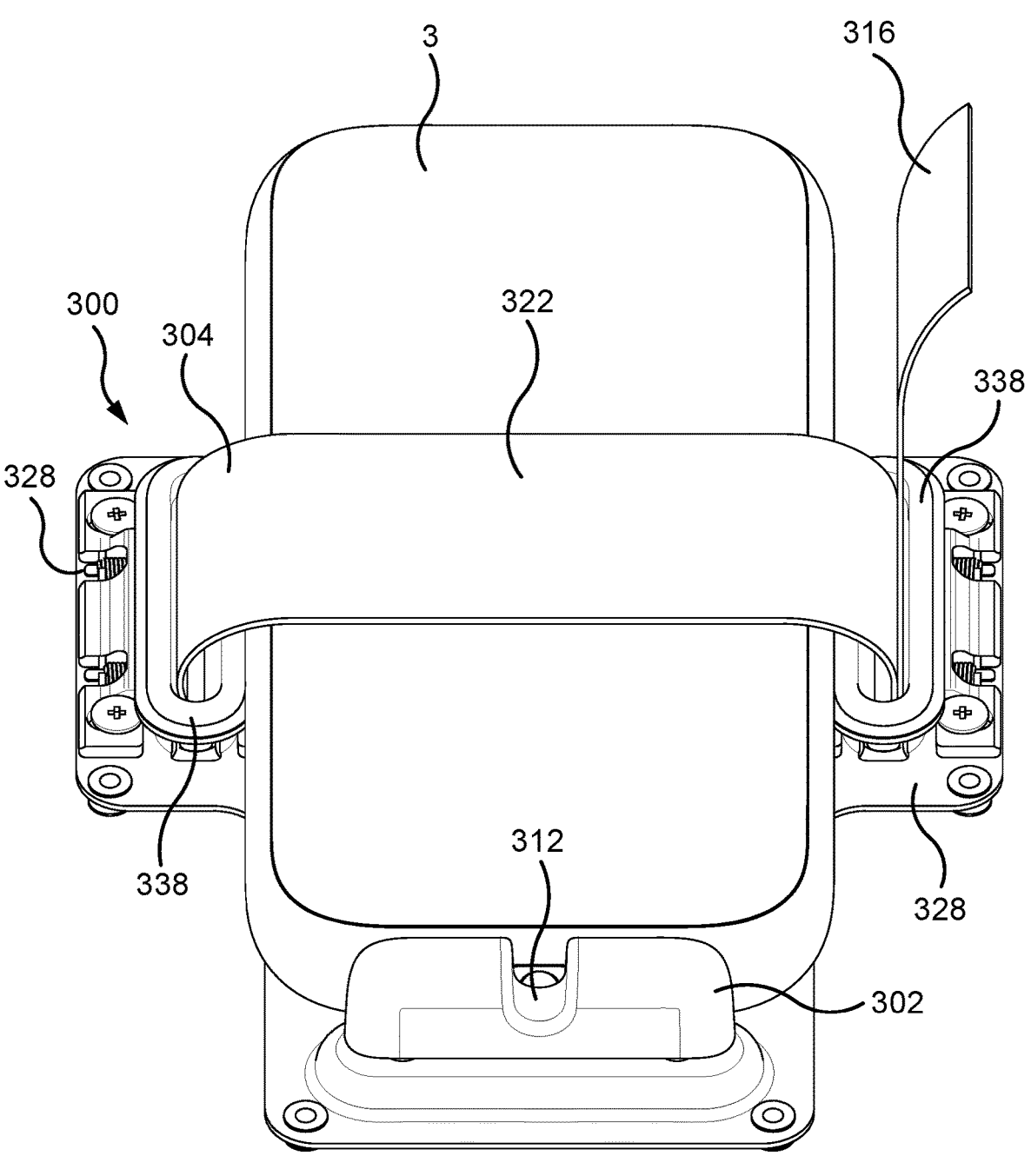
FIGS. 19 and 20 show a securing mechanism for securing an accessory in the electronic device accessory compartment, before and after being fastened, respectively.
Figure 20:
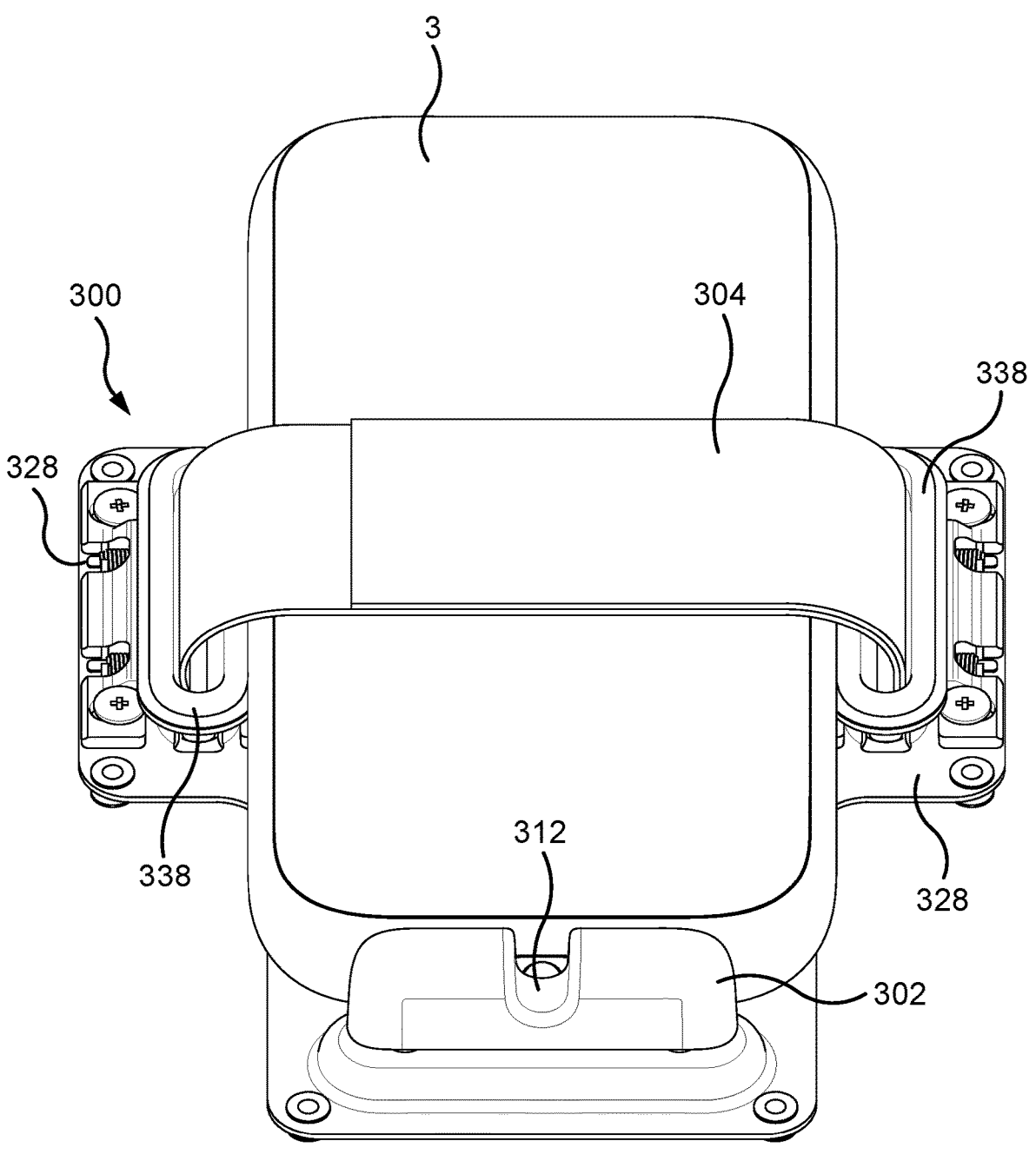

Turning to FIGS. 17-20, second shell 30 of case 10 may include a securing mechanism 300 for electronic device accessories. Merely for convenience of description, first shell 20 is omitted here. In some embodiments, second shell 30 forms an electronic device accessory compartment, similar to first shell 20 forming a compartment for a personal electronic device. The securing mechanism 300 includes a securing base 318 riveted to a rigid layer 310 of second shell 30 with a pair of mechanical sliders 328, similar to slide base 218 of slider mechanism 200 riveted to rigid layer 210 as a mechanical ground. A pair of receiving rings 338 may be fitted through the pair of mechanical sliders 328 and corresponding holes formed on securing base 318. Strap 324 ends thereof then can be fitted through receiving rings 338. In some embodiments, strap 324 and mechanical sliders 328 have a female and male buckle system such that the ends of strap 324 that extend through receiving rings 338 may snap-fit to mechanical sliders 328, respectively. In addition, strap 324 may have first and second attachment mechanisms 316, 322 such as hook-and-loop materials to fasten an accessory, e.g., a battery 3, as shown in FIG. 20.

Securing mechanism 300 may further include electronic device accessory stop 302 to secure the accessory (e.g., battery 3) and hold it in place. Referring to FIGS. 19 and 20, stop 302 may further includes a dip 312 to allow a wire or cable of battery 3 to pass through.

Figure 21:
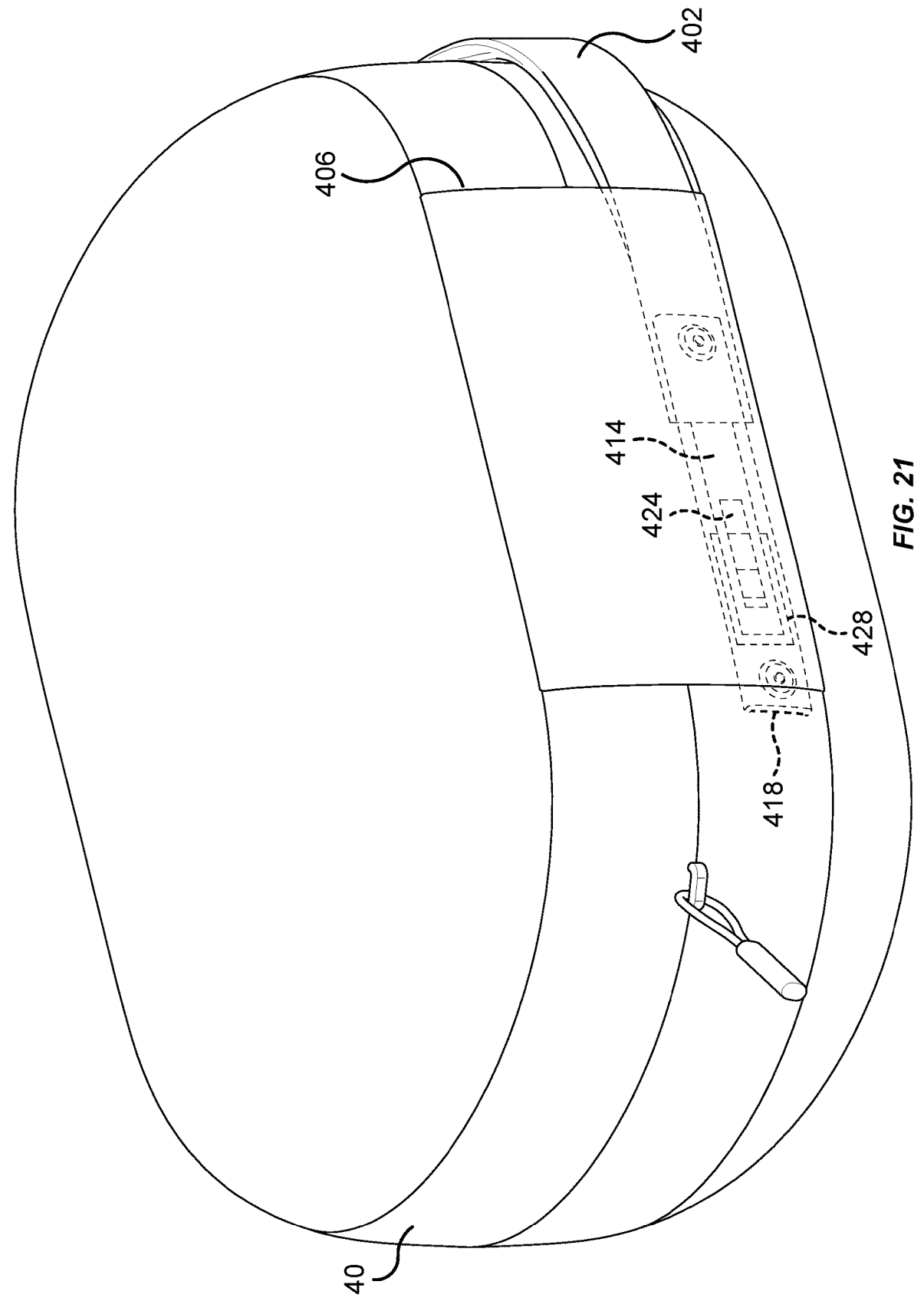
FIG. 21 shows the case of FIG. 4 with a retractable handle engaged with a retractable handle spring mechanism.
Figure 22:
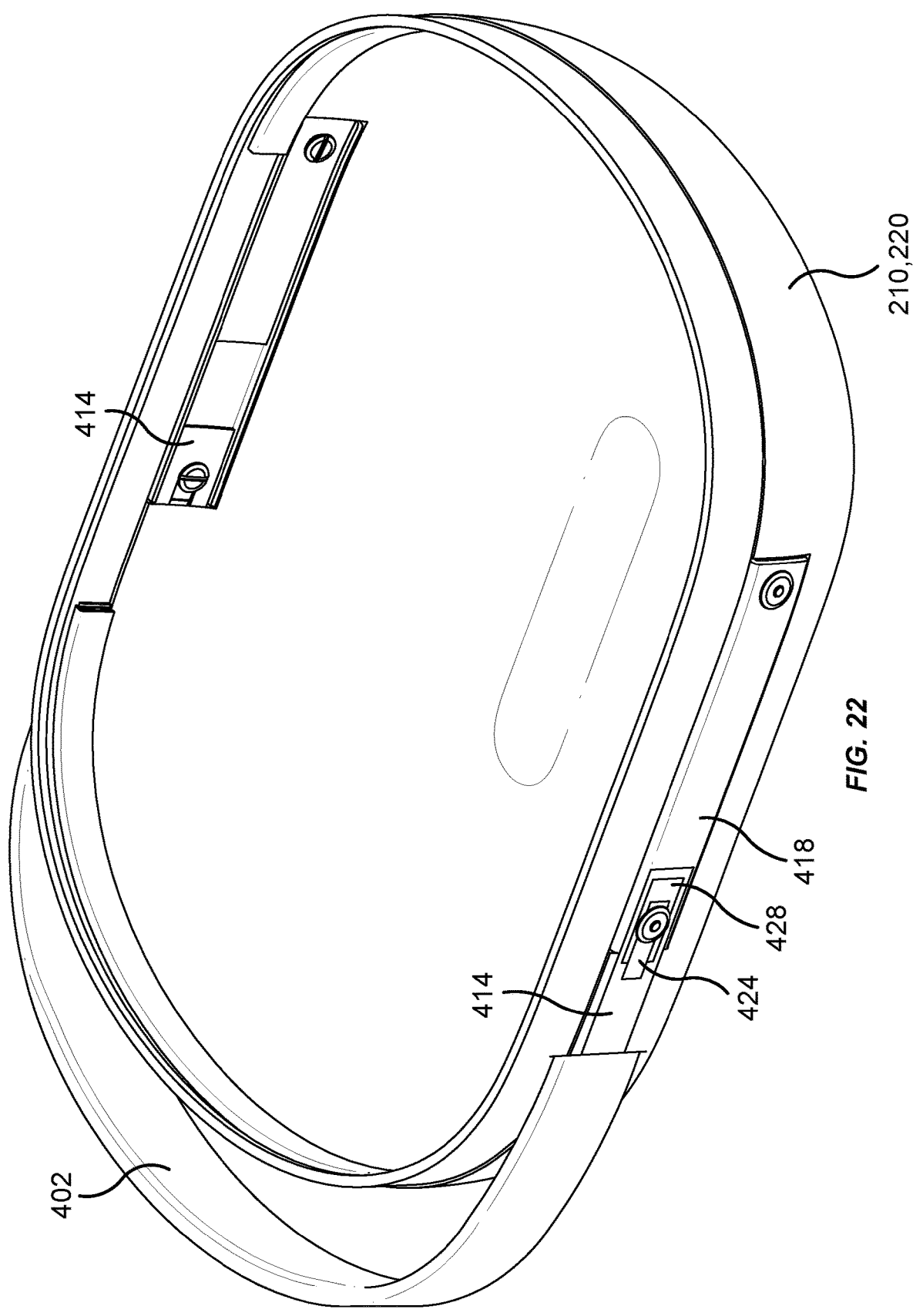
FIG. 22 shows the retractable handle engaged with the retractable handle spring mechanism engaged on the first shell of the case.

FIGS. 21 and 22 illustrate left perspective views of case 10 and first shell 20, respectively. Merely for convenience of illustration, in FIG. 22, jacket layer 230, molded foam 240, and batting 250 and descriptions thereof are omitted.

In some embodiments, retractable handle 402 may have one end 414 engaged under hinge 404 of outer jacket 40. That is, first pocket or access 406 may be defined under hinge 404, through which one end 414 extends to be engaged with a sliding mechanism including a sliding track 418 fixed (e.g., riveted) to rigid layer 210 (or 310) and a sliding bar 428 sliding on sliding track 418. Referring back to FIG. 5B, as also described above, retractable handle 402 may be engaged onto jacket layer 230 and extend into the internal side of jacket layer 230. For example, jacket layer may have an opening or slit 412 through which retractable handle 402 extends to traverse from outside jacket layer 230 to inside jacket layer 230. In use, a portion of retractable handle 402 may extend partially out from slit 412 when transitioning to an extended configuration, and that portion may retract back into slit 412 when transitioning back into a retracted configuration. Accordingly, handle 402 may extend into jacket layer 230, and one end 414 of handle 402 may remain within jacket layer 230 and further extend to engage with rigid layer 210 as shown in FIG. 22.

In some embodiments, one end 414 may have an opening 424 to be hooked on sliding bar 428 such that sliding bar 428 moves along sliding track 418 when a user pulls out retractable handle 402. In some embodiments, sliding mechanism for retractable handle 402 has a spring mechanism. For instance, sliding bar 428 may be spring connected to sliding track 418 such that when retractable handle 402 is pulled out (e.g., FIG. 22), the spring mechanism expands from a compressed state allowing retractable handle 402 to be pulled out. Once a user lets go of handle 402, the spring mechanism pulls retractable handle 402 connected to sliding bar 428 back to the initial state (e.g., FIG. 21).

Case 10 according to various embodiments described herein has various features that allow a user to comfortably and conveniently utilize while securely storing a personal electronic device.

Each of the components and their constituent parts, and other variations described herein may include corresponding features described with reference to each of the other components and features described without limitation.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A case for storing and carrying a personal electronic device, the case comprising:

a first shell and a second shell that, when closed together, form an interior cavity;

a slider mechanism coupled to the first shell, the slider mechanism comprising:

a slide base fixed to a rigid layer of the first shell;

a shield movably connected to the slide base, the shield extending within the first shell away from the slide base and configured to linearly translate relative to the slide base, wherein the shield adjustably defines a product-receiving space between the shield and a front portion of the first shell; and a slider handle that can be manipulated by a user to be secured or unsecured relative to the slide base, when the slider handle is secured the shield is held in position relative to the slide base, when the slider handle is unsecured the slider handle can be manipulated by the user to slide the shield relative to the slide base.

2. The case of claim 1, wherein the slider handle can be secured at any of multiple positions relative to the slide base, such that the shield can similarly be held in position at any of multiple positions relative to the slide base.

3. The case of claim 2, wherein each of the multiple positions at which the shield can be held defines a different distance between the shield and the front portion of the first shell, thereby defining a different size for the product-receiving space.

4. The case of claim 1, wherein the shield is connected to the slide base at a central position of the shield, and wherein side wings of the shield extend laterally over and beyond the slide base.

5. The case of claim 1, wherein the shield is spaced away from side walls of the first shell.

6. The case of claim 1, wherein the slider mechanism further comprises a slider movably coupled to the slide base and configured to linearly translate along a sliding track of the slide base, wherein the shield is fixed to the slider, and wherein the shield is movably connected to the slide base by its fixed connection to the slider.

7. The case of claim 6, wherein the slider handle is fixed to the slider.

8. The case of claim 1, wherein the slider mechanism further comprises a first attachment mechanism fixed in position relative to the first shell, wherein the slider handle comprises a second attachment mechanism fixed thereto, the second attachment mechanism being removably coupleable to the first attachment mechanism, and wherein when the second attachment mechanism is coupled to the first attachment mechanism, the slider handle is in a secured position, and when the second attachment mechanism is not coupled to the first attachment mechanism, the slider handle is in an unsecured position.

9. The case of claim 8, wherein the first and second attachment mechanisms are hook-and-loop fasteners.

10. The case of claim 1, wherein when secured the slider handle can be unsecured by a pulling force pulling the slider handle in a direction away from the slide base and the first shell, and wherein when secured the slider handle is not unsecured by forces applied in a direction of translation of the shield.

11. The case of claim 1, wherein each of the first and second shells comprises a rigid layer and a molded foam layer disposed on and covering an inner surface of the rigid layer, and wherein the molded foam layer is covered by an internal fabric.

12. The case of claim 1, wherein the front portion of the first shell internally is formed of a molded foam, such that the product-receiving space is defined between the shield and molded foam at the front portion of the first shell.

13. The case of claim 12, wherein the molded foam forms a concave boundary for the product-receiving space, and wherein the shield forms a convex boundary for the product-receiving space.

14. The case of claim 1, wherein the case further comprises a securing mechanism configured to secure an electronic device accessory and coupled to the second shell, the securing mechanism comprising:

a securing base fixed to a rigid layer of the second shell;
a strap engaged with the securing base; and
an electronic device accessory stop to hold the electronic device accessory in place.

15. A product-retention system for storing a personal electronic device, the product retention system comprising:

a case forming a cavity with a bottom wall and side walls, wherein the bottom wall is rigid and forms a mechanical ground for the product-retention system;

an attachment mechanism coupled to the bottom wall, wherein the attachment mechanism comprises a handle; and a shield movably coupled to the mechanical ground and constrained to translate along a straight line, the shield forming an adjustable product-receiving space between a front surface of the shield and a front interior wall of the case, the shield extending laterally toward the side walls of the case, lateral extents of the shield being spaced away from the side walls, wherein the shield is temporarily and repeatably fixable at any of multiple positions relative to the mechanical ground, wherein the shield does not translate relative to the mechanical ground when fixed relative thereto by the attachment mechanism in a secured configuration, and wherein the shield can be translated relative to the mechanical ground when the handle moves the attachment mechanism into an unsecured configuration.

16. The product-retention system of claim 15, wherein the attachment mechanism comprises a releasable first attachment mechanism and a second attachment mechanism;

and the second attachment mechanism is fixed in place relative to the mechanical ground, wherein attaching the first attachment mechanism to the second attachment mechanism in the secured configuration holds the shield in place, preventing it from translating, and wherein detaching the first attachment mechanism from the second attachment mechanism in the unsecured configuration frees the shield to be translated and reattached at a different location, thereby changing a size of the product-receiving space.

17. The product-retention system of claim 16, wherein the first attachment mechanism and the second attachment mechanism are hook-and-loop fasteners.

18. The product-retention system of claim 16, wherein the handle comprises a rigid first stop block that moves with the handle and prevents buckling of the first attachment mechanism, and wherein a slider comprises a rigid second stop block that moves with the slider, wherein when the first attachment mechanism is attached to the second attachment mechanism, the first stop block is disposed behind and abutting the second stop block.

19. The product-retention system of claim 18, wherein when the electronic device is received in the product-receiving space and the first attachment mechanism is attached to the second attachment mechanism, a load applied on the shield from the electronic device is transferred through the shield, to the second stop block, to the first stop block, and to the mechanical ground.

20. The product-retention system of claim 18, wherein the slider is constrained to translate along a straight line relative to the mechanical ground by a portion thereof sliding within tracks fixed to the mechanical ground, wherein the shield is coupled to the slider and thereby coupled to the mechanical ground, and wherein the constraints on motion of the slider constrain the motion of the shield; and wherein the product-retention system comprises a trim ring forming an opening through to a slide base, wherein the trim ring provides forward and rearward stops to the translational motion of the slider.

21. The product-retention system of claim 15, comprising:
a slider comprising:

a lower slider portion, wherein the lower slider portion is partially disposed under a slide base and within tracks; and a shield-holding portion configured to hold the shield in an upright position.

* * * * *